(12) United States Patent
Ziegler et al.

(10) Patent No.: US 6,778,867 B1
(45) Date of Patent: Aug. 17, 2004

(54) MONITORING AND CONTROL OF A HANDLING DEVICE

(75) Inventors: Olaf Ziegler, Geilnau (DE); Georg Berberich, Bürgstadt (DE); Franz Som, Lützelbach (DE)

(73) Assignees: Elan Schaltelemente GmbH & Co. KG, Wettenberg (DE); Reis GmbH & Co. Maschinenfabrik, Obernburg (DE)

( * ) Notice: Subject to any disclaimer, the term of this patent is extended or adjusted under 35 U.S.C. 154(b) by 0 days.

(21) Appl. No.: 09/554,606

(22) PCT Filed: Dec. 6, 1998

(86) PCT No.: PCT/EP98/07914

§ 371 (c)(1),
(2), (4) Date: Jun. 1, 2000

(87) PCT Pub. No.: WO99/29474

PCT Pub. Date: Jun. 17, 1999

(30) Foreign Application Priority Data

Dec. 6, 1997 (DE) .......................................... 197 54 208

(51) Int. Cl.[7] ................................................. G05B 9/02
(52) U.S. Cl. .............................. 700/79; 700/65; 700/66; 700/245; 318/563; 318/568.11; 318/568.16; 318/568.2
(58) Field of Search ............................... 700/65–66, 79, 700/83, 213, 214, 245, 264; 318/560, 563, 568.11, 448, 466, 568.1, 568.16, 568.2

(56) References Cited

U.S. PATENT DOCUMENTS

| | | | | |
|---|---|---|---|---|
| 4,490,660 A | * | 12/1984 | Tsuchihashi | 700/255 |
| 4,697,979 A | * | 10/1987 | Nakashima et al. | 700/247 |
| 5,086,401 A | * | 2/1992 | Glassman et al. | 700/259 |
| 5,271,092 A | * | 12/1993 | Kreuzer | 700/255 |
| 5,705,906 A | * | 1/1998 | Tanabe et al. | 318/568.13 |
| 5,760,560 A | * | 6/1998 | Ohya et al. | 318/568.1 |
| 6,636,772 B1 | * | 10/2003 | Renau | 700/83 |

FOREIGN PATENT DOCUMENTS

| | | | | |
|---|---|---|---|---|
| DE | 3902247 | | 8/1990 | |
| DE | 29620592 | | 3/1997 | |
| JP | 60160409 A | * | 8/1985 | G05B/19/42 |

* cited by examiner

Primary Examiner—Ramesh Patel
Assistant Examiner—Crystal J Barnes
(74) Attorney, Agent, or Firm—Dennison, Schultz, Dougherty & MacDonald

(57) ABSTRACT

The present invention relates to a monitoring and control device for monitoring a technical system having at least one portable and/or mobile and/or immobile device, and more specifically, a handling device that is a arranged in a protective device, and further including at least one preferably central or decentralized control unit and actuators connected thereto to carry out dangerous actions.

17 Claims, 16 Drawing Sheets

MONITORING AND CONTROL OF A HANDLING DEVICE

BACKGROUND OF THE INVENTION

The invention relates to a monitoring and control device for monitoring a technical system comprising at least one portable and/or mobile and/or immobile device, particularly a handling device that is arranged in a protective device, comprising at least one preferably central and/or decentralized control unit as well as actuators connected to it to carry out dangerous actions.

Furthermore, the invention concerns a method for the safety-related monitoring of at least one axis of a drive unit, which in particular is meant to monitor a technical system with at least one portable and/or mobile and/or immobile device with enhanced safety requirements, particularly a handling device that is arranged in a protective device, comprising at least one preferably central and/or decentralized control unit as well as actuators connected to it to carry out dangerous actions.

The invention also relates to a mechanism for the safety-related monitoring of an axis of a technical system powered by a drive unit, comprising an actual status value transmitter that is coupled with the axis, with the transmitter being connected to a two-channel drive control mechanism for evaluation purposes.

Finally, the invention concerns a method for monitoring the speed of a specific point of a handling device that can be moved, preferably of a robot flange or a tool center point (TCP) of a technical system, particularly of a handling device.

In order to design a handling device in such a way that it can be operated in the vicinity of people as well, DE 39 02 247 A1 suggests designing the actual value transmitter for status acknowledgements and control elements in a redundant fashion and providing a monitoring and safety circuit that is activated when signal deviations occur between the redundant pick-ups.

The monitoring and safety circuit responds to signal deviations between the redundant actual value transmitters; however, external safety precautions are not incorporated in the evaluation. Familiar monitoring and safety circuits also do not provide for the circuit to be able to actively intervene in the process of movements of the handling device.

From DE 296 20 592 U1 we know of a device for the safety-related monitoring of a machine axis that is equipped with a separate processor and actual value recording system as well as an error discovery system through signal comparison testing and compulsory dynamization. The device is equipped with two separate actual value recording systems, which direct their respective actual values to separate processors. The processors compare the actual values with the upper and lower limits.

From the state of the art, we know that for the monitoring and controlling of a braking device for driving mechanisms of a handling device an operator—in the case of a closed braking device—feeds electric current to a driving mechanism to generate a torque and checks visually whether the driving mechanism moves even in the case of a closed braking device. This procedure is not precise and must be conducted separately for each axis.

From the state of the art, we also do not know yet how to monitor the process of movement of a defined point in the Cartesian space with regard to position and speed.

The invention at issue faces, among other things, the problem of making a safety circuit available for the monitoring of processes of movements of a technical system that can be used in a flexible manner and enhances the safety of the technical system.

Furthermore, the invention is based on the problem of further developing a method and a device for the safety-related monitoring of an axis with a drive unit in such a way that the realization of a single-channel actual value recording sensory mechanism for enhanced safety-related requirements is made possible.

Additionally, the invention is based on the problem of further developing a method for controlling and monitoring a braking device in such a way that automatic monitoring or verification is enabled in a simple manner.

SUMMARY OF THE INVENTION

The invention is also based on the problem of monitoring the process of movement of a defined point of a device of the technical system in the Cartesian space.

In order to resolve the primary problem, it is being suggested

- to connect the monitoring and control device with sensors and/or actuators, evaluating, processing and controlling their respective status,
- to connect the monitoring and control device with the control unit and have it transmit—in accordance with the status of the sensors and/or actuators—at least one release signal to the control unit in order to enable at least one operation in the technical system,
- to have the monitoring and control device monitor the execution of this at least one operation and
- to create another signal in case of errors, moving the system into a safe status.

The monitoring and control device is designed in such a way that it can additionally be integrated into commercially available central and/or decentralized numerical controls in order to monitor dangerous operations of a technical system, particularly three dimensional dangerous movements, in a safety-related manner or manner that protects the operator(s). In case of a defective execution of the operations, a signal is generated to transfer the system into a safe condition.

The monitoring and control device is equipped with input and output levels, to which the sensors and/or actuators are connected. Additionally, interfaces are provided in order to possibly connect the monitoring and control device with the existing central control unit via a bus.

In a preferred version, the monitoring and control device is connected to a robot control mechanism. The design ensures that the at least one actuator and/or the at least one sensor is designed as a safety device that transfers the technical system into the safe status. In particular, the actuator is designed as a drive unit with appropriate drive controls or as a contactor that connects the technical system or the drive controls with energy.

When all actuators and/or sensors are in a condition that agrees with the safety requirements, the release signal of the monitoring and control device triggers an operation such as a process of movement, which is monitored by the control and monitoring device preferably by comparing it with stored and/or specified values such as execution and/or function and/or plausibility specifications or processes of movements.

In order to be able to use the monitoring and control device in a flexible manner, the invention provides for the control unit to be connected to the at least one actuator and/or sensor and the monitoring and control device via at least one data circuit, preferably a serial bus line. In particular, the control unit and the monitoring and control device are physically designed as separate devices.

In order to ensure safe monitoring of the processes of movements, the invention's design is such that the control unit continuously or once transmits a target status value signal to the at least one connected drive control and/or to the monitoring and control device as well as actual status value signals from the at least one drive control to the control unit, preferably both to the control unit and to the monitoring and control device, that the actual status value signals of every drive control are compared to the drive-specific values and/or value ranges that are stored in the monitoring and control device and transmitted by the control unit and that when the respective value and/or value range is left another signal is generated.

In order to achieve as high an error safety rate as possible, the drive controls and the monitoring and control device, respectively, are equipped with at least two channels in a redundant design, with the channels being connected to each other via the bus line CAN_A and another bus line CAN_B, with control signals and/or actual value information being transmitted via the bus line CAN_A and actual value information via the bus line CAN_B. For the evaluation of electromechanical safety switches or similar sensors and for the addressing of external switching devices or actuators, the monitoring and control device is equipped with a two-channel output and input level, with at least two more bus connections being provided for in order to be able to connect the monitoring and control device with a higher-ranking safety bus.

In a preferred version, the actual status values transmitted from the drive controls are declared with an identifier, with an interrupt being triggered in each microcontroller of the monitoring and control device upon receipt of this identifier and the actual status values being read within a time interval. Additionally, each value and/or value range is assigned at least one safety-related output and/or input of the monitoring and control device, with the outputs and/or inputs being connected to passive and/or active switch elements such as electromechanical safety switches and/or contactors and a relay.

In order to perform service work and to initialize the technical system, the central control unit transmits target status value information to start up defined positions such as SAFE position, SYNC position to the drive units and the monitoring and control device, with the defined positions being assigned drive-specific values that are transmitted to the monitoring and control device and compared with the measured actual status values of the drive units.

According to the invention, the technical system is not equipped with any hardware limit switches such as cams, but rather with axis-specific "electronic cams." In particular, a variety of value ranges is defined with regard to one drive unit or one drive axis, with this unit or axis being monitored by the monitoring and control device in a drive-specific manner, and with each value and/or value range being assigned one or more outputs of the monitoring and control device. The values and/or value ranges can be programmed in an axis-specific manner. When exceeding a status value range, one or more outputs of the monitoring and control device are set so that the technical system can be turned off.

In the method for safety-related monitoring of at least one axis of a drive unit, the problem is resolved in the invention by recording and evaluating an actual status value signal of the at least one axis, with the actual status value signal being formed by two periodic signals that are phase-displaced towards each other, with the sum of the powers of the respective amplitude of the signals being formed and compared to a value within a value range, and with an error signal being generated if the sum is not within the specified value range.

The method with enhanced safety provides for the actual status value signal of the at least one axis to be recorded in a single-channel manner and evaluated in a two-channel manner, with the actual status value signal being formed by two periodic signals that are phase-displaced towards each other, for the sum of the amplitude squares to be formed in each channel and compared to a constant value or a value within the value range, for an error signal to be generated if the sum does not correspond to the specified value or is not within the value range, and for the actual status value signal to be fed to the other two-channel monitoring and control device, which compares the sums of amplitudes squares formed in each channel of the drive control with each other and/or with the constant value or the value within the value range.

Preferably, the actual status value signal is composed of a sine- and a cos-signal, with a plausibility check of the actual value signals being conducted in each channel, thus checking whether the sum of the squares of the output amplitudes at every scanning point of time corresponds to a specified value x, with x being within the range $0.9 \leq x \leq 1.1$, preferably $x=1=(\sin \phi)^2+(\cos \phi)^2$.

As an error-avoiding and/or error-controlling measure, the invention provides for a directional signal of a target speed or status value to be generated and compared to a directional signal of the actual speed or status value in a single-channel or two-channel manner and for the values generated in a single-channel or two-channel manner to be fed to the monitoring and control device and compared to each other there.

Furthermore, the invention provides for an internal cross-comparison of the recorded actual values to be conducted between the channels, preferable between the micro-computers, and for a pulse-block to be triggered in case of an error.

When the usual energy supply is lacking for the drive units (power down mode), a standstill monitoring process is conducted, with the actual values being monitored in each channel and a "marker," which is transferred into the monitoring and control device when the usual energy supply sources have been turned back on and compared to the stored target values, being set when the actual values change beyond the set tolerance limit.

In the arrangement for the safety-related monitoring of an axis of a technical system that is driven by a drive unit, comprising an actual status value transmitter that is coupled with the axis and connected to the two-channel drive control for evaluation purposes, the problem is resolved by providing a design in which the actual status value transmitter is a single-channel item and has at least two outputs where two periodic signals that are phase-displaced towards each other can be picked up when the axis turns, in which the outputs are connected to one channel of the drive control, respectively, and in which the individual channels of the drive control are connected on the one hand with a higher-ranking central or decentralized control unit and on the other hand with a two-channel monitoring and control device in order to be able to compare the received actual value signals.

When the drive unit of a driving mechanism does not permit time value recording, the invention provides for a design in which the two-channel drive control, which is connected to the actual status value transmitter, is located as an integral part of the monitoring and control device or as self-contained unit independently from the drive unit in front of the device. In this case, the monitoring and control device can also be equipped with the drive control for actual value recording purposes. Of course the device for actual value recording can also be located in front of the monitoring and control device as a separate unit.

In a beneficial version, the actual value transmitter has the design of a resolver with two analog outputs for the actual value signals and an input for a reference signal, with the outputs, respectively, being connected to a channel of the drive control via an analog-to-digital converter and with the input for the reference signal being connected to a reference generator, which in turn is connected to the regulating unit of a channel via a control unit.

For control purposes of the actual value recording process, the analog-to-digital converter of the second channel is connected to an interrupt input of the signal processor via a first connection, and the analog-to-digital converter of the first channel is connected via a second connection with an input of a driver component, whose output is connected to an interrupt control unit of the microcontroller. The time between two received interrupt signals (EOC) is measured and a stop signal is then triggered if no interrupt signal (EOC) is detected within a certain time frame. A pulse block is also generated when the reference frequency deviates from a frequency standard.

In order to be able to control the error of a mechanical division for a single-channel drive and transmitter shaft of the resolver, the invention provides for the drive unit to be an electric drive system that is fed as an intermediate circuit, preferably as an AC servomotor.

In a method for controlling and monitoring a braking device with a nominal torque or moment ($M_{NOM}$) that is allocated to a drive unit of a technical system such as a handling device, automatic monitoring/verification is enabled by measuring and storing a braking current ($C_B$) of the drive unit that corresponds to a braking moment when the braking device is opened, by feeding the drive unit with an axis-specific current value ($C_{TEST}$), which loads the braking device with a moment that is equal to or smaller than the nominal moment ($M_{NOM}$) of the braking device, when the braking device is closed, and by monitoring the drive mechanism simultaneously for standstills.

Based on the invented method, the braking devices are monitored/verified automatically. When the braking devices are closed and current is fed, the drive mechanism is monitored for standstills. As soon as one axis or one drive mechanism moves, an error signal, which points to the defect of a braking device, is generated via the standstill monitoring system. In particular, this design provides the opportunity of monitoring all braking devices of a handling device simultaneously by feeding all drive mechanisms with a current value when the braking device is closed.

In a preferred version, the current value ($C_{TEST}$) results from the measured braking current ($C_B$) and an offset current ($C_{OFFSET}$) based on the relation $$C_{TEST} = C_B \pm C_{OFFSET}$$

with $C_{OFFSET} = x \cdot C_N$
with $0.6 \leq x \leq 1.0$, preferably $x=0.8$
with $C_N$ being a current that generates a nominal moment corresponding to the maximum nominal moment of the braking device.

If the axis or drive mechanism that is to be checked is an axis under gravity load, then the braking device is loaded with a certain moment due to the gravity of e.g. the robot arm, which corresponds to the braking moment. For the purpose of testing the dividing device, the drive mechanism is fed a current value that generates a moment, which has an effect in addition to the moment created by gravity, in the same direction.

According to another development, the invention provides for the current value $C_{TEST}$ to generate a moment in the drive mechanism that amounts to 60 to 90% of the nominal moment, preferably to 80% of the nominal moment.

Furthermore, the invention includes a design for axes not subject to gravity load in which the braking device can be released via an external switching contact and addressed via an external auxiliary energy source. This operating mode is only applied in emergency situations. The higher-ranking robot control mechanism and/or the monitoring device can be turned off. In this mode, the robot mechanism can be moved manually, for example in order to release a trapped person.

In order to solve production disruptions, the invention provides for the monitoring for standstills of the remaining axes that are subject to gravity load when the braking devices of a group of axes that are not at all or only insignificantly subject to gravity load, such as head axes, are released individually. This operating mode is of advantage when e.g. after a disruption in the current source with a burnt welding wire a welding robot has become jammed in an area of the work piece that is difficult to access. In this case, the braking device can be lifted on a group of axes without gravity load in order to move the axes manually into a better position.

In a preferred version, a current supply source is added for the braking devices via an external control and monitoring device, with a drive control that is connected to the braking device generating a signal with which the braking device of an axis is opened or lifted. Apart from increased safety, this also enhances flexibility with a variety of motors or brakes that are connected.

The invention furthermore relates to a method for monitoring the speed of a moveable, device-specific point of a technical system, particularly a handling device.

In order to be able to monitor the process of movement of the defined point in the Cartesian space, the actual status value signals are recorded by the drive units, Cartesian coordinates of the point are calculated from the actual status value signals through a transformation operation, and the calculated Cartesian coordinates are compared to stored values and/or value ranges in order to generate a signal for stopping the device when the transformed Cartesian coordinates exceed the value and/or value range.

In a preferred version, verification of a safely reduced speed occurs relative to the handling device-specific point, with a difference vector being calculated by subtracting a first Cartesian coordinate set at a first scanning point in time from a second Cartesian coordinate set at a second scanning point in time, with a Cartesian speed of the point being determined via a time difference between the first and the second scanning point in time and with a signal being generated to stop the drive units when the calculated speed exceeds a specified maximum speed.

In another preferred method, a so-called brake ramp monitoring process occurs, where upon the triggering of a signal for stopping the device a starting speed of the point is determined and stored, where after a given time period the current speed is determined and compared to the starting speed and where then, when the current speed after the time period is equal to or larger than the starting speed, a signal is generated to immediately stop the device.

Further developments result from the sub-claims, which include at least in part invented versions of the inventions.

BRIEF DESCRIPTION OF THE DRAWINGS

Further details, advantages and features of the invention do not only result from the claims, the features derived therefrom—either on their own and/or in combination—, but also from the following description of the versions described in the figures.

They show.

DETAILED DESCRIPTION OF THE INVENTION

Figure 1:
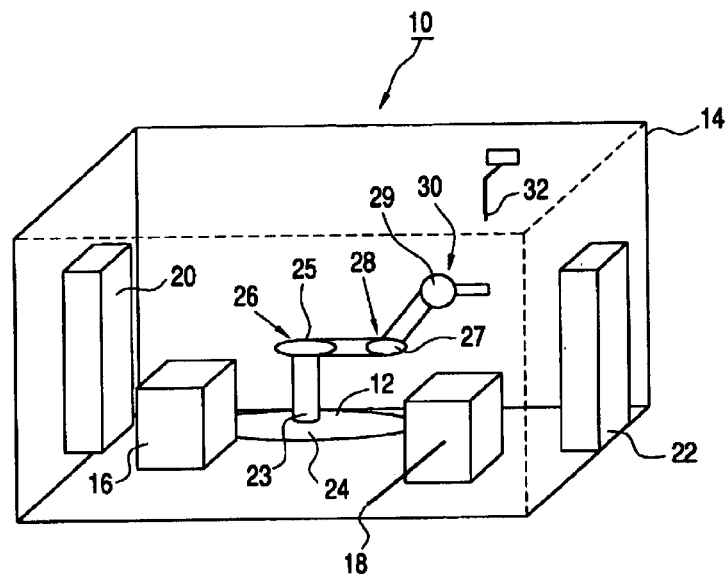
FIG. 1 diagrammatic view of a technical system, comprising a handling device that is arranged in a protective room, FIG. 2 a logic diagram of a control system used to control and/or regulate the handling device, FIG. 3 a logic diagram of a monitoring and control device, FIG. 4 a logic diagram for addressing a power level, FIG. 5 a logic diagram of a drive control, FIGS. 6–9 basic circuit designs of the safety switching elements integrated in a hand-held programming device, FIG. 10 a flow chart of the function "SAFE POSITION,"

FIG. 1 depicts the diagrammatic view of a technical system 10 with enhanced safety requirements. In the described example, the technical system 10 consists of a handling device 12, which is arranged within a safety design such as the protective room 14 together with two placement spots 16, 18, which can be fed via allocated protective doors 20, 22. The handling device 12 is described as a robot 12 in the following.

In the example described here, the robot 12 can be moved around at least four axes 23, 25, 27, 29, with each axis 23, 25, 27, 29 being assigned an actuator 24, 26, 28, 30, which is described as a drive unit 24, 26, 28, 30 in the following. Of course the actuator can also be a contactor that supplies the drive unit 24, 26, 28, 30 with energy. In order to be able to synchronize the robot 12 for example after a power failure, a synchronization point or contact 32 is arranged within the protective room 14.

When the robot 12 is located in a position above the placement spot 18, then protective door 20 can be opened in order to feed the placement spot 16. During this phase, the position of the robot 12 is monitored in a manner as described in the following. Sensors like switching contacts of the protective door 20 are connected to actual status value signals of the robot 12 so that a disconnection is created when the robot 12 leaves its position above the placement spot 18 within a certain specified safety area.

Figure 2:
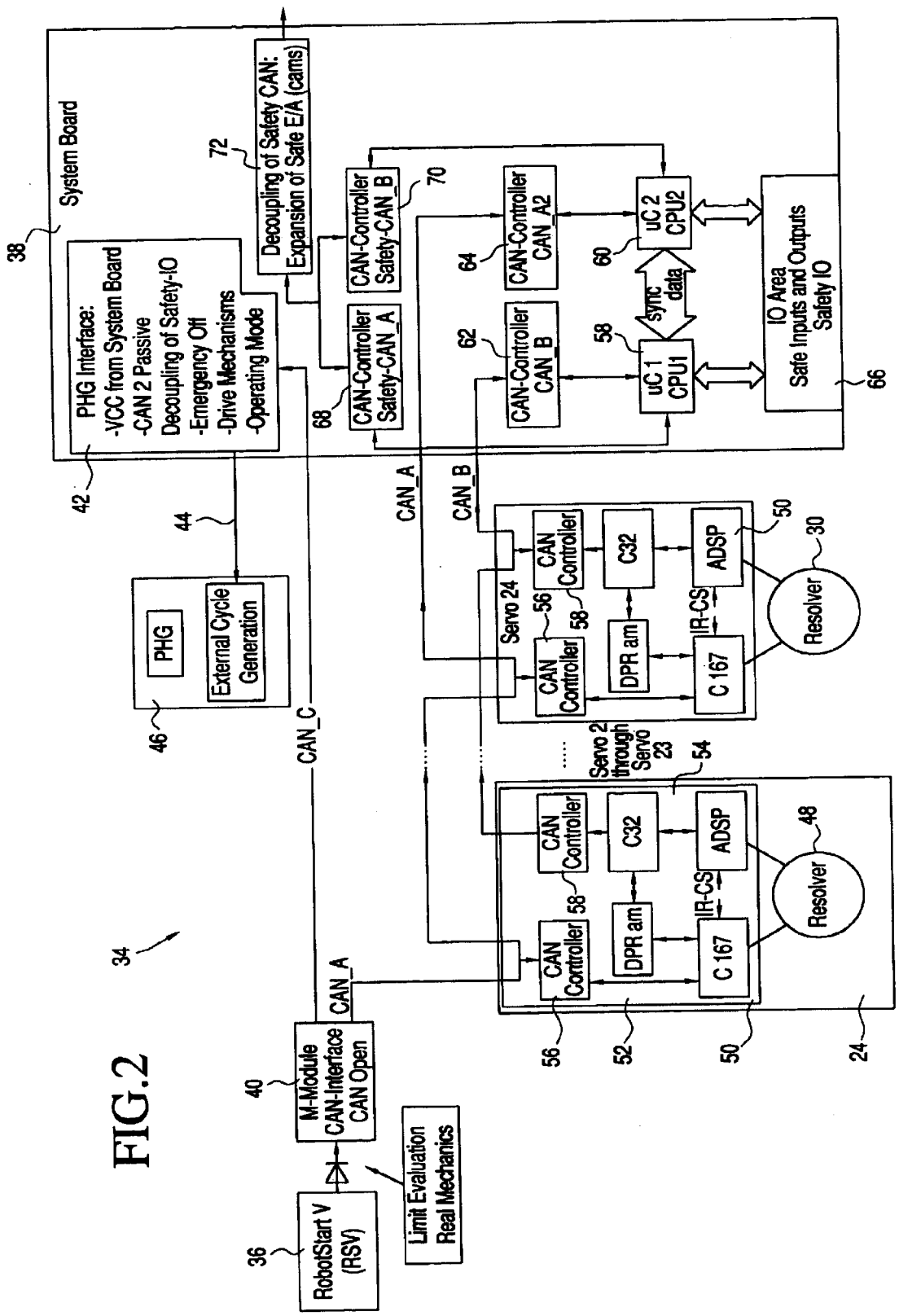

FIG. 2 shows a control system 34, consisting of a central and/or decentralized control unit such as the robot control 36, the drive units 24 through 30 as well as a monitoring and control device 38, which is called the safety controller 38 in the following. The robot control 36 is connected via an interface 40 with a hand-held programming device 46 and a bus line CAN_A with the drive units 24–30 and the safety controller 38 in a stranded manner. Furthermore, the safety controller 38 is connected to the hand-held programming device 46 via a connecting line 44. The hand-held programming device 46 can also be used to program the robot control 36, for which the interface 42 of the safety controller 38 is connected via a bus line CAN_C and the CAN interface 40 with the robot control 36.

The drive units 24–30 have the same design, which will be explained on the example of the drive unit 24. In order to record actual status value signals, the drive unit 24 has a resolver 48, which is connected to a drive control 50 with redundant design. The drive control 50 has two channels or circuits 52, 54, with each channel containing its own CAN controller 56, 58. The CAN controllers 56 are connected among each other with the bus CAN_A, which connects the drive control 50 on the one hand with the robot control 36 and on the other hand with the safety controller 38. The CAN controllers 58 are connected among each other via another bus CAN_B, which connects the controllers 58 with the safety controller 38. The drive unit 24 comprises furthermore a motor, a power supply part, possibly a gear mechanism and a braking unit (not shown).

The safety controller 38 also has a two-channel design and an autonomous micro-computer 5, 60 in each channel. The micro-computers 58, 60, respectively, are connected via a CAN controller 62, 64 with the bus line CAN_B or the bus line CAN_A. Furthermore, the micro-computers 58, 60 are connected to an input-output level 66 in order to connect or read safe input and outputs. Safe inputs and outputs of the input-output level 66 are e.g. connected to contacts of the protective doors 20, 22 of the protective room 14. For additional data exchange, the micro-computers 58, 60 can be coupled via further CAN controllers 68, 70 and an interface 72 with a higher-ranking safety bus.

The robot control 36 assumes the responsibility of all central regulating and control tasks and is not subject to any safety considerations. In particular, the robot control 36 is physically independent from the safety controller 38 so that operational processes occur in separate devices. It is planned that the safety controller is connected via the input/output level 66 with the sensors or switching contacts of the protective doors 20, 22 and via the bus lines CAN_A and CAN_B with the actuators or drive units 24, 26, 28, 30 in order to evaluate, process and control the status. In accordance with the status of the switching contacts of the protective doors 20, 22 and/or drive units 24, 26, 28, 30, the safety controller transmits at least one release signal to the control unit 36 so that the robot 12 can execute an operation. Afterwards, the execution of the at least one operation is continuously monitored by the safety controller. In case of an error, another signal is generated, with which the system 10 is transferred into the safe status.

The next signal involves a "STOP-1" function, i.e. the signal initiates a controlled stop, with energy supply to the drive units being maintained in order to achieve a stopping and interrupt energy supply only when the standstill has been reached.

In the robot control 36 all target status values of the respective drive units 24–30 are calculated and transferred one after the other via the bus CAN_A to the drive units 24–30. The drive units 24–30, respectively, transfer an actual status value back to the robot control via the bus CAN_A, whereupon in the robot control 36 values such as slipping distance, towing distance etc. can be calculated.

For recording purposes of the actual status value the resolver 48 is provided, which is mechanically coupled directly with the motor via a motor shaft. Analog actual value signals exist at the output of the resolver 48, which are digitized in the drive control 50. The resolver 48 supplies the drive control 50 with information, which serves for the axis-specific regulating of processes. In particular, a current regulating process for the power supply part addressing the motor is achieved with the drive control 50. The actual value information, however, is not transferred via the bus CAN_A to the robot control 36, but also transferred to the safety controller 38 via the bus lines CAN_A and CAN_B in a redundant manner in order to be monitored there.

Figure 3:
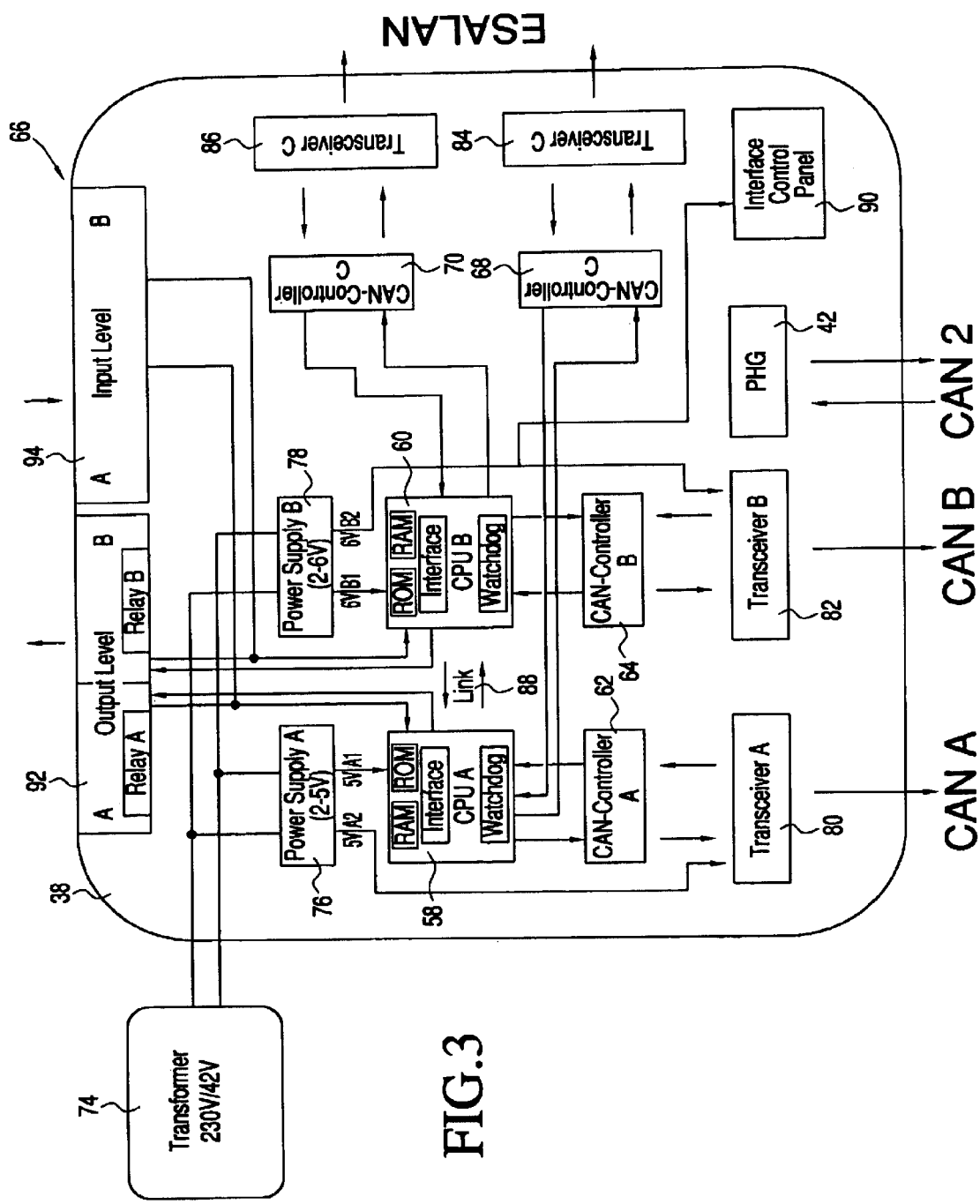

FIG. 3 depicts a detailed layout of the safety controller 38. The safety controller 38 is supplied with energy by an external power supply unit 74. Every micro-computer 58, 60 is assigned its own power supply part 76, 78, which is connected to the power supply unit 74. The CAN controllers 62, 64 are connected via the transceiver 80, 82 with the bus lines CAN_A and CAN_B. Furthermore, the micro-computers 58, 60 are connected via the additional CAN controllers 68, 70 and transceivers 84, 86 with a higher-ranking safety bus. The interface 42 for the hand-held programming device 46 is connected via the bus CAN_C on the one hand with the robot control 36 and on the other hand with the hand-held programming device 46, with the bus CAN_C being physically looped through within the safety controller 38.

The micro-computers 58, 60 are connected to each other via a connection 88 for the purpose of data exchange. This way, the actual values that are received in the individual channels can be compared with each other.

Alternatively to the hand-held programming device 46, the safety controller 38 and/or the control device 36 can also be operated via a control panel (not shown), whose interface is part of the safety controller 38 and connected to at least one micro-computer 58, 60.

The input/output unit 66 comprises an output level 92 and an input level 94. The output level comprises switching transistors that can be addressed by the micro-computers 58, 60. The input level 94 comprises inputs to which safety switching devices such as emergency/off switches or other switching contacts can be connected. A safety switching device is connected between an input of the first and second micro-computer 58, 60 or an output of the first and second micro-computer 58, 60, respectively. The inputs are read inputs of the respective micro-computer 58, 60 and the outputs are write outputs of the micro-computers 58, 60. Actuators such as contactors can be connected to the output level 92 for the switching of a release signal. The input level 94 exists in order to be able to connect sensor such as switching contacts, emergency off switches, proximity switches, etc.

Generally, the technical system 12 with the appropriate control 36 and drive units 24–30 is addressed via power supply contactors or main contactors K1, K2, which are connected directly with an output of the monitoring and control device 38.

Figure 4:
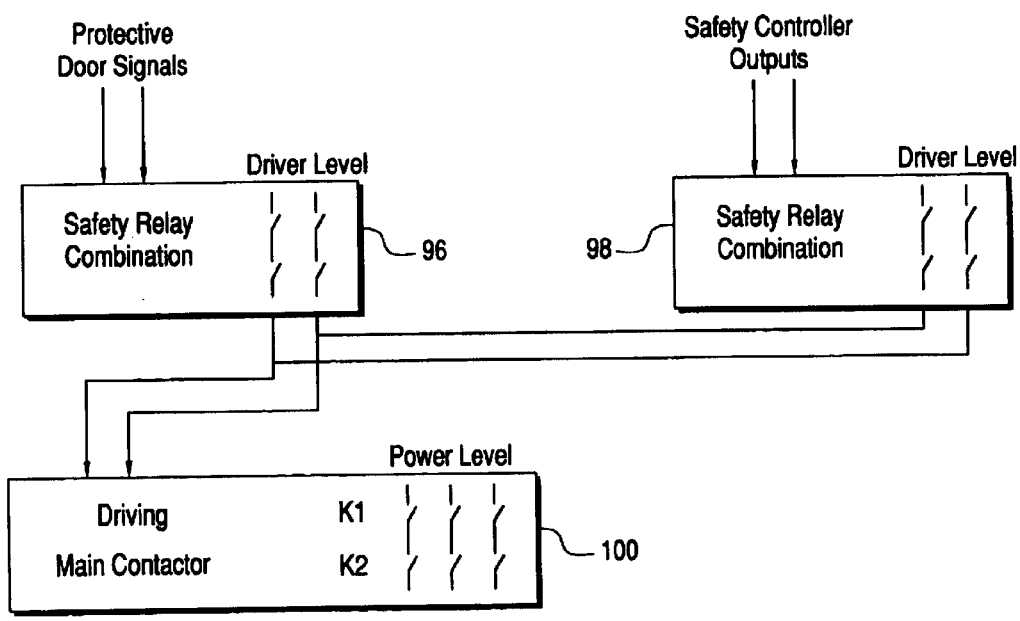

Alternatively, addressing can also occur in accordance with the layout in FIG. 4, with the outputs of the monitoring and control device 38 being eliminated.

FIG. 4 is a basic logic diagram for addressing the power unit of the drive units 24–30. The monitoring switching contacts of the protective doors 20, 22 are connected to a safety relay component 96. Outputs of the safety controller 38 are connected to a second safety relay component 98. The outputs of the safety relay components are coupled with each other and address the main contactors K1, K2 of a power switch 100. The drive unit is supplied with energy via the main contactors K1, K2. Addressing of the main contactors K1, K2 occurs either via the safety controller 38, the protective doors 20, 22 or a combination of both signals.

The robot control 36 can address a total of 24 drive units, with the safety controller 38 being in a position to monitor the same amount of axes.

The safety controller 38 receives the actual status values of the respective drive units 24–30 via the buses CAN_A and CAN_B. Both buses serve the redundant actual status value recording process. The bus CAN_A represents an operational bus for the robot control 36, with the bus CAN_B representing a transmission circuit that is additionally integrated into the system in order to achieve redundancy. Since in this case two independent transmission mediums are involved, the occurrence time of the second error is decisive for discovering hardware errors in one of the two transmission circuits. All information transmitted via the buses CAN_A or CAN_B is processed in the separate CAN controllers 62, 64 and made available to the respective micro-computers 58, 60. The higher-ranking micro-computers 58, 60 are also decoupled. Thus, this is a completely redundant system as far as the transmission medium and the processing of received information is concerned.

All safety-relevant signals are sent to the inputs of the input level 94. This way, the safety controller 38 also assumes the evaluation of the sensors such as electromechanical safety switches, in addition to monitoring tasks. Via the output level 92, actuators such as external electromechanical relay combinations can be selected, which can then be combined with external signals, for example protective door signals, or the outputs of the safety controller 38 are connected directly with the power contactors K1, K2.

Figure 5:
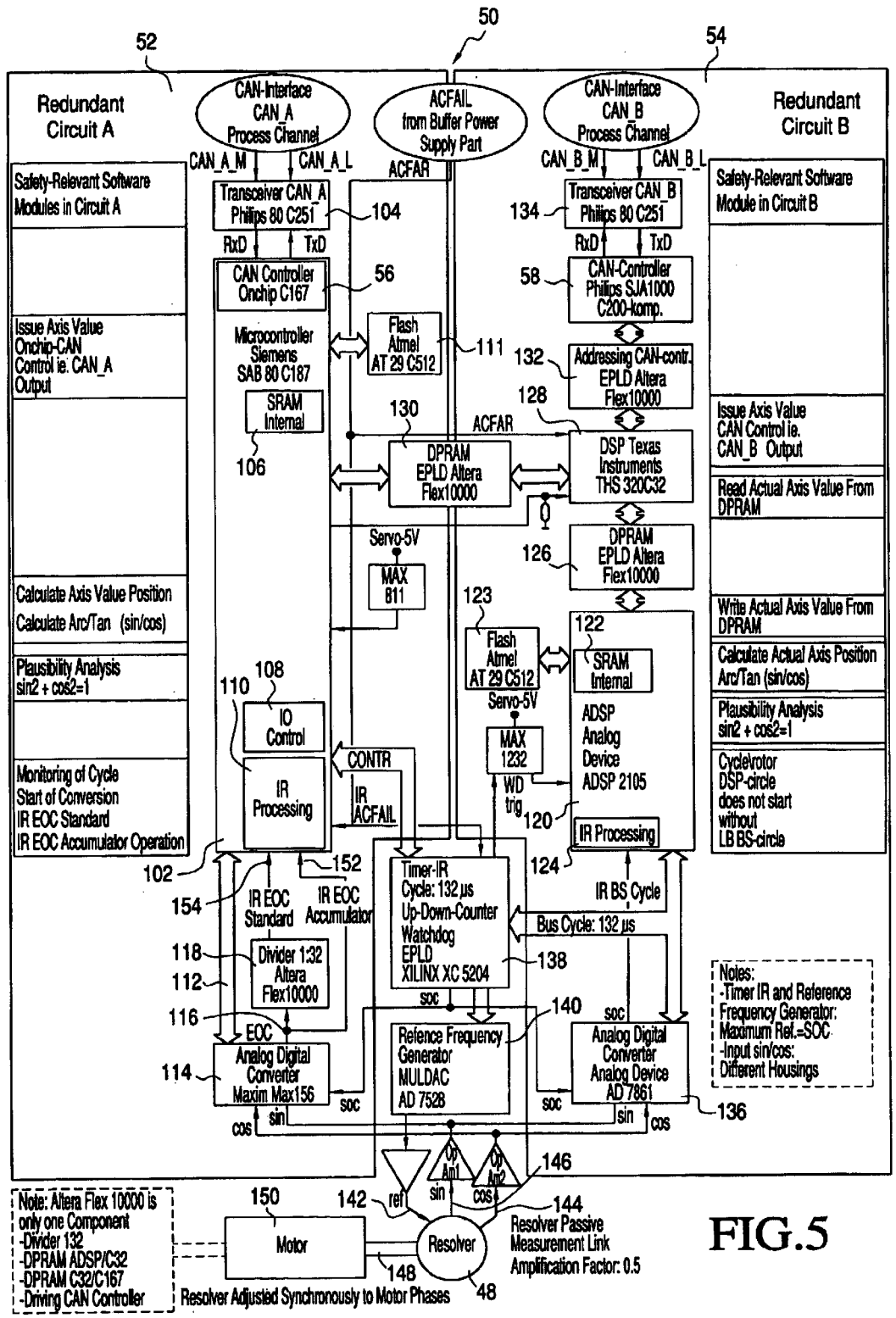
Figure 6:
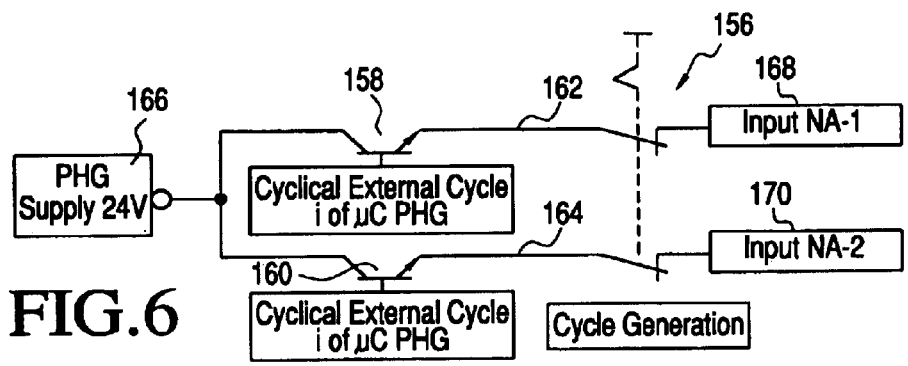
Figure 7:
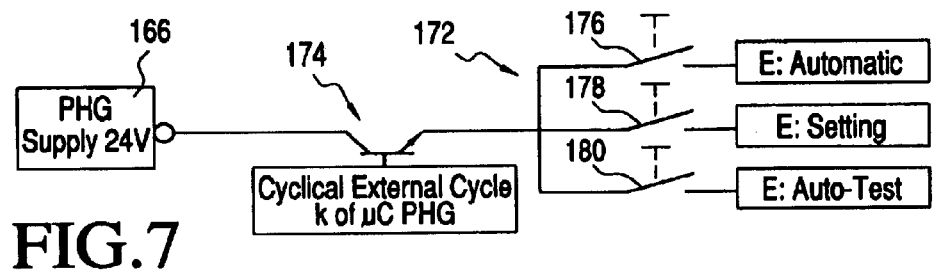

FIG. 5 depicts a logic diagram of the drive control 50 with the resolver 48. The drive control 50 consists of the redundant circuits 52 and 54. The circuit 52 is equipped with a micro-computer 102, which has the CAN controller 56 as an integral component and chip. The CAN controller 56 is connected to the bus CAN_A, consisting of the data lines CAN_A_H and CAN_A_L, via a transceiver 104. Furthermore, the micro-computer 102 includes an internal SRAM 106, a IO control mechanism 108 as well as an IR processing device 110 and is connected to an analog-to-digital converter via a bus 112. An output 116 of the analog-to-digital converter 14 is connected on the one hand directly with the micro-computer 102 and on the other hand with the micro-computer 102 via a divider 117.

The second channel 54 is equipped with a first signal processor 120 with internal SRAM memory as well as an internal IR processing device 124. The first signal processor 120 is connected to a second signal processor 128 via a DPRAM 126. This in turn is coupled with the micro-computer 102 via a DPRAM 130. The signal processor 128 is connected to a driver 132, which controls the CAN controller 58. The CAN controller 58 is connected to the bus CAN_B via a transceiver 134, which comprises the lines CAN_B_H and CAN_B_L.

The signal processor 120 is connected via a bus with an analog-to-digital converter 136 on the one hand and with a control element 138, which contains a timer, a counter and a status generator, on the other hand. The control element 138 is furthermore connected via a bus with the micro-computer 102. The control element 138 is also connected via a bus with a frequency generator 140, which generates a reference signal for the resolver 48. For this purpose, an output of the frequency generator 140 is connected to an input 142 of the resolver. And finally, the control element 138 has another output, where the SOC (start of conversion) signal can be found. This output is connected to an input of the analog-to-digital converters 114, 136.

The resolver has a first output 144, where a sine signal can be found. The first output 144 is connected to an input of the analog-to-digital converter 114, 136 via an amplifier. Furthermore the resolver has a second output 146, where a cosine signal can be found. The second output 146 is connected to an input of the analog-to-digital converters 114, 116 via an amplifier. The resolver 48 is coupled via a shaft 148 and a motor 150. The resolver 48 is adjusted synchronously to the motor phases.

With reference to FIG. 2 it should be noted that the drive control 50 represents a self-contained unit, with the safety controller 38 exercising no influence whatsoever on the drive control 50. When the drive control 50 detects an error, this message is sent directly to the safety controller 38 or a pulse block is activated in the drive control 50, i.e. the transmission of actual value information is stopped. Since the safety controller 38 has a time expectancy circuit towards actual value signals, the lacking of these actual value signals leads to the fact that the main contactors K1 and K2 are turned off by the safety controller, thus transferring the system into a safe condition.

Generation of the actual value occurs by feeding the resolver 48 a reference signal via the input 142. The reference signal is generated in the reference frequency generator 140, which is selected by the control element 138. A central timer, which generates pulses for a counting step and a status generator connected to it, is integrated in the control element 138. At the peak of the reference voltage the SOC (start of conversion) signal for the analog-to-digital converters 114, 136 can be found. Apart from a coil that is fed the reference signal, the resolver 48 is equipped with two additional coils, which are preferably coupled with the motor shaft and where a sine and a cosine current can be found.

The reference coil is specified the reference signal, which is coupled inductively onto the sine and cosine coils. Depending on the position of the sine/cosine coil, a sine/cosine signal is obtained at the outputs 144, 146 with constant amplitude and frequency. Depending on the position of the rotor, a phase displacement (0 ... 360°) occurs between the reference signal and the sine or cosine signals. At the peak of the reference signal or reference voltage, the sine and cosine signals are scanned, and an actual position is calculated from the ratio of the two amplitudes within one resolver revolution. A rotation angle $\phi$ of 0 to 360° corresponds to an actual value of 0 to 4096 increments for a resolution of 12 bit. The resolver 48 must be adjusted synchronously to the motor phase in order to provide maximum torque. This means that the phase angle $\phi=0$ is to be set. When the phase angle becomes larger, the torque of the motor decreases continuously and is exactly zero at $\phi=+90°$ and $\phi=-90°$. When the phase angle exceeds $\phi=\pm90°$, a pole reversal of the direction occurs, i.e. a positive speed specification has the effect that the motor turns in the negative direction. This would turn the control circuit into an unstable condition, and the motor could no longer be controlled.

In order to recognize such a pole reversal in the direction, the motor control should be provided with speed plausibility check. Here, the sign of the target speed or status value is constantly compared to the sign of the actual speed or status value.

If both signs are contrary over a defined period of time, one can proceed on the assumption that a reversal in the direction exists. Observation over a defined period of time is necessary to keep the monitoring process from not responding in the case of operational control fluctuations.

The sine or cosine signals that exist at the outputs 144, 148 of the resolver 48 are fed to the analog-to-digital converters 140, 136. Once the conversion has occurred, the analog-to-digital converter 136 provides an EOC (end of conversion) signal, which starts the operational system cycle of the signal processor 120. It is only when the operating system cycle runs properly that the appropriate actual status values are forwarded via the DPRAM 126 to the signal processor 128, which transfers them via the driver 132, the CAN controller 38 and the transceiver 134 to the bus CAN_B, via which the actual values are transferred to the safety controller 38. Should the operating system cycle not be triggered properly, a "STOP-0" signal, i.e. safe stop of operation, is sent to the safety controller 38 via the bus CAN_B. The error message "STOP-0" affects a stopping of the system by immediately turning off power supply to the drive units, which is also called uncontrolled stopping.

Upon successful conversion of the input signals, the analog-to-digital converter 114 supplies an EOC signal (end of conversion), which is sent into an interrupt input of the micro-computer 102 via the timer 118. Internally, the time between two received EOC interrupts is measured in order to check for a deviation of the reference frequency from the frequency standard, preferably 7.5 kH, or complete non-existence of the reference frequency, e.g. when the central timer fails. In this case a pulse block is activated, and a signal "STOP-0" is sent to the safety controller 38 via the bus CAN_A.

As soon as the signal processor 122 receives the EOC signal an internal timer is triggered, which is decremented in a cyclical administrative part of the operating system and responds when the counter reaches zero, i.e. when the EOC signal fails. In this case the pulse block is activated as well. The pulse block switches the motor to the "torque-free" status. When the watchdog is selected, a hardware test is triggered and the safety controller 38 transfers the system 12 into a safe condition.

Additionally, the invention provides for a variety of measures for error recognition and error treatment. In order to check the analog-to-digital converters 114, 136 of the reference frequency generator 140 as well as the outputs 144, 146 of the resolver 48, a plausibility check is conducted. The plausibility check occurs through the two amplitudes of the sine/cosine signals of the resolver 48 in such a way that the sum of the amplitude squares $(\sin \phi)^2 + (\cos \phi)^2$ is ideally the sum x with x in the range of $0.9 \leq x \leq 1.1$, preferably x=1. In order to suppress a selection of the plausibility check due to disruptions such as noise in the signal lines, the sum x is assigned a defined tolerance window. A prerequisite for the plausibility check is the standardization of the sine/cosine signals, which are established once and are not changed thereafter.

In the case of non-plausible amplitudes for the sine and cosine signals, each channel 52, 54 sends the "STOP-0" signal separately to the safety controller 38. Formation of the actual value and the plausibility check are conducted redundantly in the micro-computers 102, 120, with the micro-computer 102 working at a reduced recording rate. Recording every 32 periods corresponds to $32 \times 132 \mu s = 4.2$ ms (10 ms/Rev at 6,000 RPM max). The micro-computer 102 sends its actual values via the bus CAN_A, and the micro-computer 120 sends its actual values via the signal processor and the bus CAN_B to the safety controller 38, which checks the received values and acts as a safe comparison element. At the same time, the micro-computers 102 and 120, 128 conduct an internal cross-comparison via the DPRAM 130 and react in the case of errors by actuating the motor brake, activating the pulse block and sending the signal "STOP-0" via the buses CAN_A and CAN_B. It should be noted here that activation of the pulse blocks stops the motor more quickly than the safety controller 38.

In order to monitor the statistical offset between the transmitter and the engine shaft or to monitor a misadjustment of the resolver 48 as well as to monitor a dynamically controlled slippage between the resolver 48 and the engine shaft 148, a speed plausibility check is conducted. The speed plausibility check is also conducted redundantly in the micro-computers 102, 120. Both micro-computers 102, 120 send independently from each other the signal "STOP-0" to the safety controller 38 via the buses CAN_A or CAN_B in case of a responsive monitoring process. The speed plausibility check can only work properly if the status and speed control is active, i.e. during normal operation when the drive mechanism are turned on.

In a so-called "power down mode," i.e. the drive mechanisms have no operating voltage, a standstill check is conducted by the micro-computers 102, 120, by recording the actual values of the drive mechanisms. If a change to the actual values occurs that is beyond a set tolerance limit, a marker "machine asynchronous" is set in the micro-computers. The two asynchronous markers are sent to the safety controller 38 upon restarting and compared there.

Furthermore, a speed plausibility check is conducted in order to recognize a pole reversal in the direction on the drive mechanism. The sign of the target speed or status value is constantly compared with the sign of the actual speed or status value. If both signs are contrary over a defined period of time, one can proceed on the assumption that a reversed direction exists. Observation over a defined period of time is necessary to prevent that the monitoring process responds in the case of operational control fluctuations. The permissible control fluctuation must be defined.

In the case of a phase offset between the resolver 48 and the engine shaft 148 that is smaller than $\pm 90°$ as well as in the case of a dynamically uncontrolled slippage of the resolver on the motor shaft 148, a two-channel towing distance monitoring phase is triggered in the signal processor 128 as well as the micro-computer 102. At first, the actual status value is subtracted from the target status value (control deviation). After that, it is checked whether the determined control deviation is within the tolerance setting. When the tolerance range is exceeded, the micro-computer 102 and the signal processor 128 request the signal "STOP-0" from the safety controller 38. The towing distance examination is conducted in every status control cycle, which is preferably 2 ms.

Furthermore, internal error detection mechanisms are triggered in the micro-computer 102 and the micro-computer 120. The EOC signal of the analog-to-digital converter 114 is sent to the micro-computer 102 via two interrupt inputs 152, 154. The input 152 is fed the EOC signal directly, while the input 154 receives the EOC signal after it has passed the programmable divider 118, preferably at a division ratio of 1:32. During normal operation, only the input 154 is active. In the "power down mode" only the interrupt input 152 is active since the divider component 118 is idle in the "power down mode." During normal operation, the time between two operating system runs is preferably 2 ms, smaller than the time between two EOC signals, preferably 4 ms. If an EOC signal exists on the interrupt input 154, an interrupt routine is triggered, in which the following operations are conducted: First an interrupt marker is set, then a counter (value range 0 . . . 2000 ms) is read and memorized, and then the digital value that is fed via the bus 112 is read and stored. The operating system checks the interrupt marker in every run in order to see whether an interrupt had occurred before that. If no interrupt occurred, only an operating system cycle counter is incremented. If an interrupt occurred, however, the exact time between two EOC signals and thus the frequency is determined from the difference between the timer counter (up-to-date) minus timer counter (predecessor) and from the number of operating system cycles. Furthermore, the stored converted digital value is processed, and the operating system cycle counter, as well as the interrupt marker, are set to zero. If after a defined number of operating system runs no interrupt is recorded, one can proceed on the assumption that a hardware error exists in the central timer 138.

No frequency examination of the EOC signal occurs in the micro-computer 120, only the existence of the EOC signal is checked with a software watchdog. When the EOC signal arrives at the micro-computer 120, an interrupt occurs, thus winding an internal timer, which is decremented in a cyclical administrative part (waiting for interrupt) of the operating system and responds when the timer is at zero, i.e. when the EOC signal has failed. In this case, the pulse block is activated.

When the pulse block is activated, a control input of an IGBT part is taken back, thus making the drive mechanism "moment-free." For this control input, the driver signals of channel 52 and channel 54 are combined with each other in a piece of hardware. If a driver signal of a channel 52, 54 is taken back, the pulse block in the IGBT is set. Selection of the pulse block occurs in a two-channel manner and becomes only single-channel after combination in the hardware.

The following should be noted for actual value recording by the safety controller 38. The operational bus CAN_A serves as the first channel to the safety controller 38 for redundant actual value recording. Apart from actual value signals, operational data is also transferred on this bus. The transmission speed can be up to 1 Mbit/s. Since the bus can be loaded up to 92%, the data bites are not secured at a higher-ranking level. The safety controller 38 filters the actual value signals from the information that is available.

The second channel is an additional physically separated bus CAN_B. Its function consists of connecting the two channels 54 of the drive units with the second channel of the safety controller 38 for actual value recording purposes. The data generated in the channel 54 of the drive control 50 is put on the bus CAN_B independently of the channel 52. This way, redundant independent data transmission occurs to the safety controller 38. In the safety controller 38, the data is accepted with separate transceivers 80, 82 and processed with separate CAN controllers 62, 64.

If a message exists at the transceiver 80, 82, it is reported to the CAN controller 62, 64. The CAN controller 60, 64 decides whether this message starts with the identifier that was declared to be the actual value information. If this is the case, it triggers an interrupt in the micro-computer 58, 60. The micro-computer 50, 60 selects the CAN controller 62, 64. When the micro-computer 50, 60 has received all actual values within a defined period of time, the transformation routines start. This process occurs independently in both micro-computers 50, 60.

The robot control 36 and/or the safety controller 38 are programmed via the hand-held programming device 46. The hand-held programming device 46 is connected to the safety controller 38 and the bus CAN_C via a flexible line 44 in order to transmit programming instructions from the hand-held programming device 46 to the robot control 36. This bus line is looped through within the safety controller 38 and has no electrical connection with the internal components such as the micro-computers of the safety controller 38.

Apart from the operational functional keys, the hand-held programming device 46 contains safety-related switches or sensing devices such as the emergency off switch, operating mode selection switch, permissive switch, on switch and off switch. The design of the safety-relevant switching elements of the hand-held programming device 46 are explained with FIGS. 6 through 9.

An emergency off switch 156 (FIG. 6) that is integrated into the hand-held programming device 46 is monitored for cross circuits because the supply line 44 is subjected to considerable strain. Cross circuit recognition is realized with the help of pulses generated by switching elements 158, 160 via one channel 162, 164, respectively. The channels or lines 162, 164 are connected to an external supply voltage device within the hand-held programming device 46 via the switching elements 158, 160. The lines 162, 164 are connected to the inputs 168, 170 of the safety controller 38. The switching elements generate a cycle for testing the lines 162, 164 within semi-conductor groups in the safety controller 38. This cycle has a time expectancy status compared to the cycle that is generated. If a channel 162, 164 is fed a cycle, all other inputs 168, 170 are monitored for input status changes. The release of an output is only permitted after the hand-held programming device 46 has sent the respective pulses via the emergency off channels 162, 164 and time expectancy was set.

Furthermore, the hand-held programming device 46 is equipped with an operating mode selection switch 172 (FIG. 7), which has the design of a key-operated switch. The hand-held programming device generates a cycle via a clock generator 174, which differs from the cycle of the emergency off device. The position of the operating mode selection switch 172 is subjected a plausibility check. The operating mode selection switch has three make contacts 176, 178, 180 in the version described here, while one make contact of the operating mode selection switch 172 must always be closed and two make contacts always have to be in the open status. Only one position of the operating mode selection switch is accepted. Overall, three function types can be set. The function type "AUTO" is only possible when the protective screen (20, 22) is closed. The "SETTING" function is monitored for safely reduced speed, as explained in the following, and the "AUTO TEST" can only be executed with help of the permissive switch 182.

Figure 8:
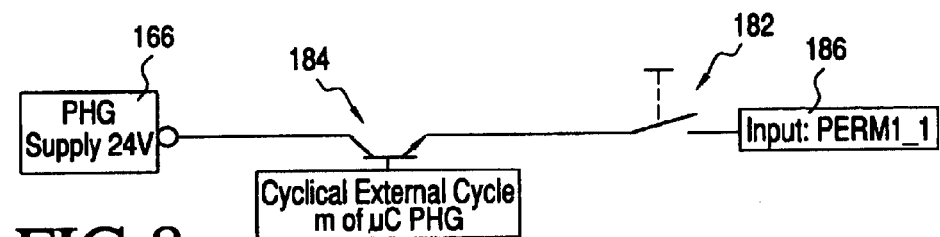
Figure 9:
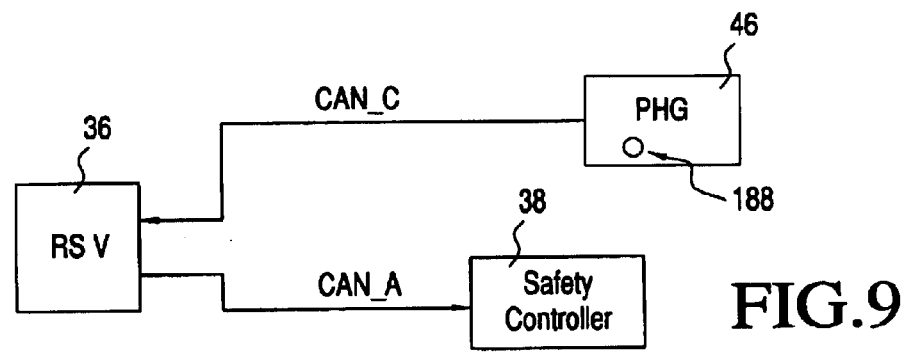

FIG. 8 depicts the function of the permissive switch 182. The permissive switch is connected to the supply voltage device 166 via a clock generator 184. An input 186 of the safety controller 38 monitors the cycle of the clock generator 184. The permissive switch has the design of single-channel, three-step selecting device. Only the middle step (ON) is evaluated.

The drive devices are turned on with a commercially available, not safety-related switch 188 of the hand-held programming device 46. Information is read into the robot control 36 via the CAN_C and passed on the safety controller 38 via the bus CAN_A. The function "DRIVE MECHANISM OFF" is triggered with a commercially available switch with break function. This function can occur from a random number of places. The information is read into the safety controller 38 and passed on the robot control via the bus CAN_A.

As was mentioned above, the safety controller 38 and/or the robot control 36 can be parameterized via the hand-held programming device 46. The hand-held programming device includes operating or user software. Upon complete parameterization, the operator must conduct an acceptance inspection test and check safety-relevant functions. Safety-relevant data that cannot be changed, which must be loaded as basic parameterization, can be loaded via a serial interface with the help of a PC. All loaded data is sent back from the safety controller 38 to the PC in a different format and presentation for the purpose of confirmation by the user. The user must confirm the received data.

According to the state of the art, handling devices have mechanical cams that secure the appropriate safety areas. These cams are located either directly on the robot axes or, in the case of linear motors, these cams are e.g. designed as limit switches at the end of the path.

According to the invention, the movements of the robot 12 around its axes are secured with "electronic cams." The "electronic cam" is stored as a value range in the memory of the micro-computer 58, 60 in the safety controller 38, and a certain movement range of the robot is assigned to it, with the stored values being compared with transmitted actual status values via the buses CAN_A and CAN_B. As long as the drive mechanism, i.e. the actual status values, are in the defined area of the electronic cam, this will be defined as a correct function. The axis to be monitored is located in its target status. When the electronic cam, i.e. the stored value range, is left, the axis leaves its target status and the safety controller 38 takes back an output that is allocated to this value range. This output can affect the main contactors K1, K2 directly or can be connected to external protective devices, such as protective door contacts 20, 22, via a relay combination.

When an operator wants to enter the protective room 14, a safety position or "SAFE POSITION" is selected. In this case, all axes 23–29 are monitored for standstills. The safety position can be selected or requested automatically, with active monitoring of this function occurring automatically through the monitoring and control device when it is requested from the robot control 36.

When the safety position is requested from the robot control 36, the robot 12 moves into a defined position. When all drive units 24–30 or all axes 23–29 have come to a standstill, the safety controller 38 sets an output in the output level 92. This output is connected, for example, with a safety contact of the protective door 20, 22. The protective door 20, 22 can be opened without an error message generating a disconnection, since the robot 12 is being monitored for standstills. When one of the drive units 24–30 or one of the axes leaves the monitored position, the safety controller 38 takes back the previously set output. This output is connected externally with the protective door 20, 22 in accordance with Control Category 3 as defined in EN 954-1. When the protective door 20, 22 is opened while one or several drive units 24–30 are moving, the output of the safety controller 38 drops when the protective door 20, 22 is opened and the main contactors K1 and K2 are no longer supplied with energy (see FIG. 4).

Figure 10:
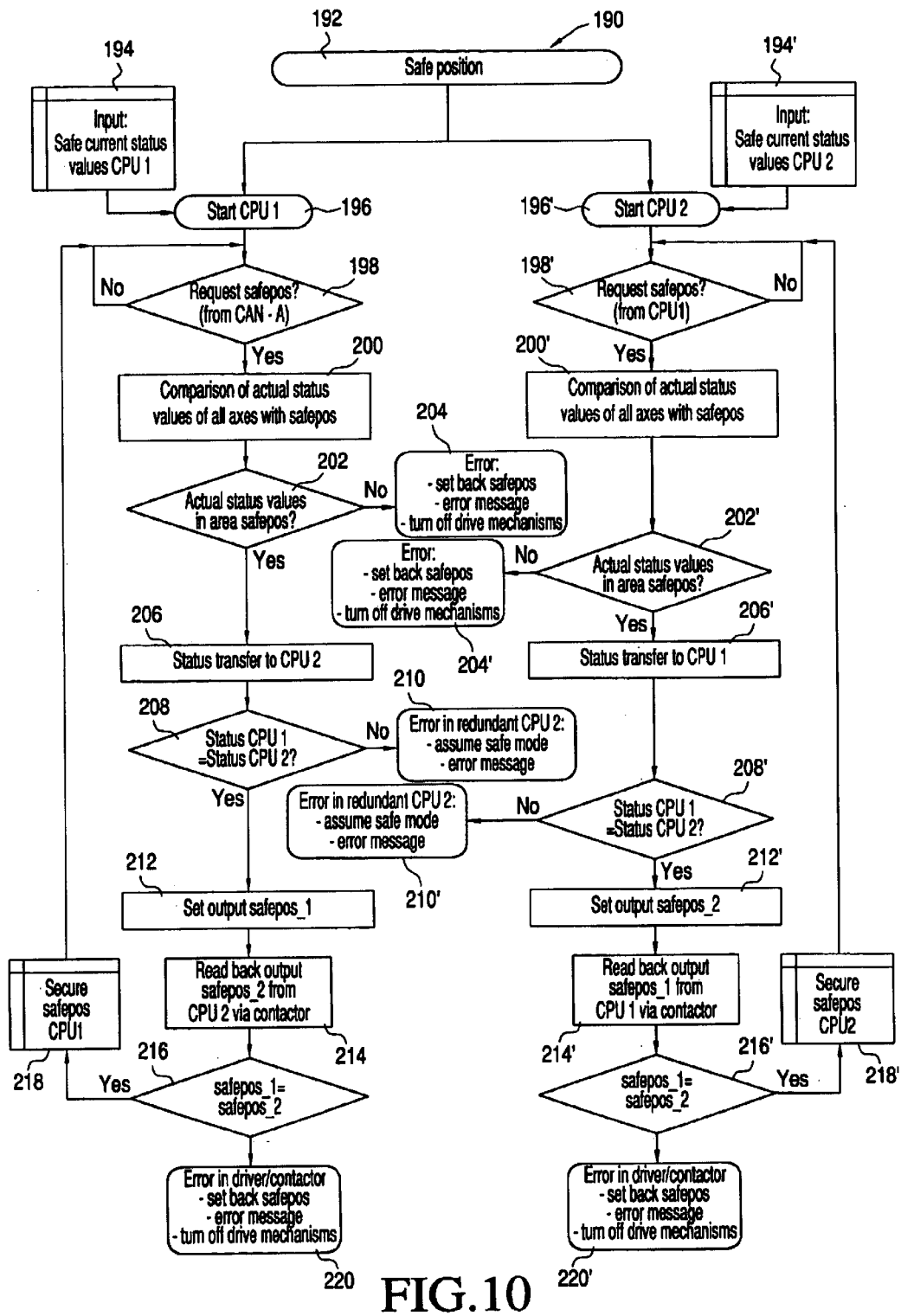

FIG. 10 shows a flow chart 190, in which the process steps for setting the safety position (SAFE POSITION) are shown. The program process occurs redundantly in the micro-computers 50, 60 of the safety controller 80. An explanation will be provided with the help of the program process in the micro-computer 58 (CPU 1). In a first step 192, the robot control 36 requests the safety position via the bus CAN_A. The respective micro-computers 58, 60 are fed the redundant actual status value via the buses CAN_A and CAN_B through input 194, 194'. Receipt of the request of the robot control starts the program process with a step 196, 196'. In a second step 198, 198' a query is started to find out whether a request for the safety position exists. If there is a request, the current actual status value of all axes is compared with the safety position in a next program step 200, 200'. In a next program step 202, 202', an examination is conducted as to whether the actual status value is within the range of the safety position. If this is not the case, an error message is generated in a program step 204, 204', with which the safety position is set back and the drive mechanisms are turned off.

If the actual status values are within the range of the safety position, the status is transferred from the micro-computer 58 to the micro-computer 60 and vice versa in another program step 206, 206'. In the program step 208, 208', a comparison is performed as to whether the status of the micro-computer 58 corresponds to the status of the micro-computer 60, and vice versa. If this is not the case, an error message is generated in the program step 210, 210', and the robot is transferred into a safe status. If the status of the micro-computer 58 corresponds to the status of the micro-computer 60 and vice versa, an output "SAFE POS_1" and "SAFE POS_2", respectively, is set in the output level 92 by each micro-computer 58, 60 in a program step 212, 212'. After that, in program step 214, 214', the output "SAFE POS_2" is read back by the micro-computer 58, or the output "SAFE POS_1" is read back by the micro-computer 60. A program step 216, 216' checks whether the outputs "SAFE POS_1" and "SAFE POS_2" have the same status. If this is the case, this information is sent to the input 198, 198' with the program step 218, 218'. Otherwise an error message is generated with the program step 220, 220', the outputs are set back and the drive mechanisms are turned off.

Figure 11:
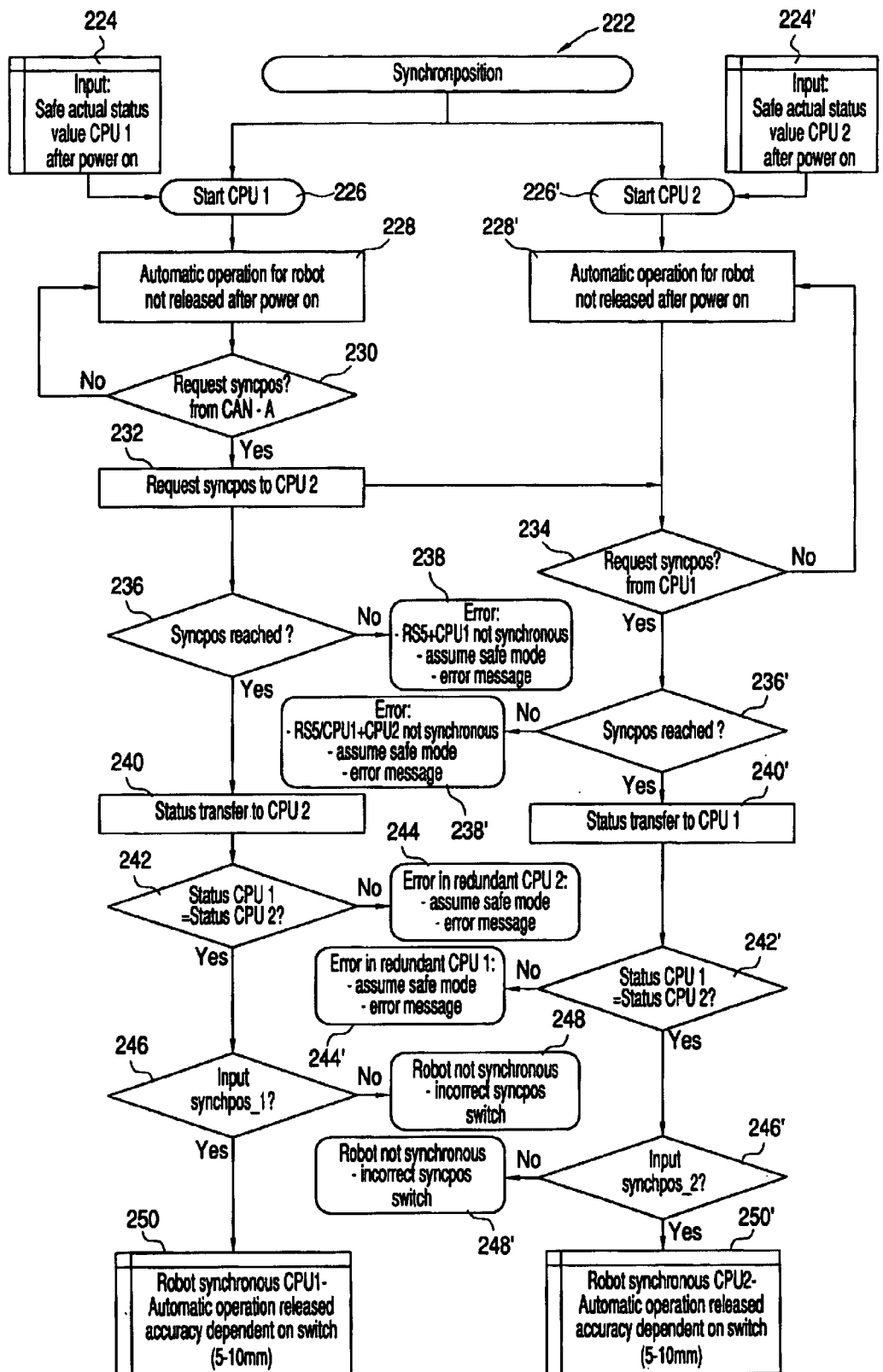
FIG. 11 a flow chart of the function "SYNCHRONOUS POSITION,"

When the robot control starts up, a safe synchronous position is required. A flow chart for setting the synchronous position is shown in FIG. 11. After turning them back on or after "POWER ON," the redundant micro-computers 102, 102 of the drive control 50 check each other's actual status values that were stored in flash memory 111, 125 when they were turned off. Since the resolver 48 only works absolutely on one revolution, the mechanical position of the robot 12 must be safely synchronized to these actual status values in an additional routine step. This occurs by moving into the synchronization position 32. An evaluation is performed by the safety controller, shown in FIG. 11 with the flow chart 222. Initially, in a first program step 224, 224', information about the actual status values upon connection is sent via the buses CAN_A and CAN_B to the respective micro-computers 58, 56.

Upon start of program step 226, 226', it is found in another program step 228, 228' that automatic operation for the robot 12 after "POWER ON" has not been released. With the next program step 230, a query is run whether a request for setting the synchronous position has occurred via the bus CAN_A. After that, in a program step 232, a request occurs from the micro-computer 58 to the micro-computer 60 for setting the synchronous position, whereupon a query is started in a program step 234. If no request for setting the synchronous position occurs, program step 228, 228' is followed and automatic operation for the robot 12 is not released after "POWER ON."

If a request for setting the synchronous position has been received, it is checked in a next program step 236, 236' whether the synchronous position has been reached. Should this position not be reached, an error message is generated in program step 238, 238', and the robot is moved into a safe position. When the synchronous position has been reached, a status transfer is initiated between the micro-computers 58, 60 with a program step 240, 240'. After that, in program step 242, 242', an examination is performed whether the status of the micro-computer 58 corresponds to that of the micro-computer 60. Should the status not agree, an error message is generated in program step 244, 244', and the robot is switched into a safe status. If the status agrees, an input SYNC POS_1 of the micro-computer 58 or an input SYNC POS_2 of the micro-computer 60 is checked in program step 246, 246'. If there is no signal on the inputs, a program step 248, 248' generates an error message, which indicates that the robot is not synchronous due to a defective synchronization switch. On the other hand, automatic operation is released in the case of synchronous robots in a program step 250, 250'.

In the example described here, the synchronous position is defined by the synchronous switch 32. The synchronous switch can be activated by the robot 12 when the synchronous position has been reached, or otherwise an operator can acknowledge the synchronous position manually. The synchronous position must be unambiguous. It must not be reached through any other angle combination of the robot axes. An inaccuracy of the safety position switch of about 5 to 10 mm is acceptable for human safety.

In every case, the protective doors 20, 22 must be closed when the robot moves into the synchronous position or the synchronous switch, otherwise movement of the robot must occur via a permissive switch. It is only when program step 250, 250' safely indicates correct synchronization that all monitoring processes start. The request to the safety controller 38 to monitor the synchronous position occurs via the robot control 36 and via the bus CAN_A as soon as the robot control has positioned the robot in the synchronous position.

Figure 12:
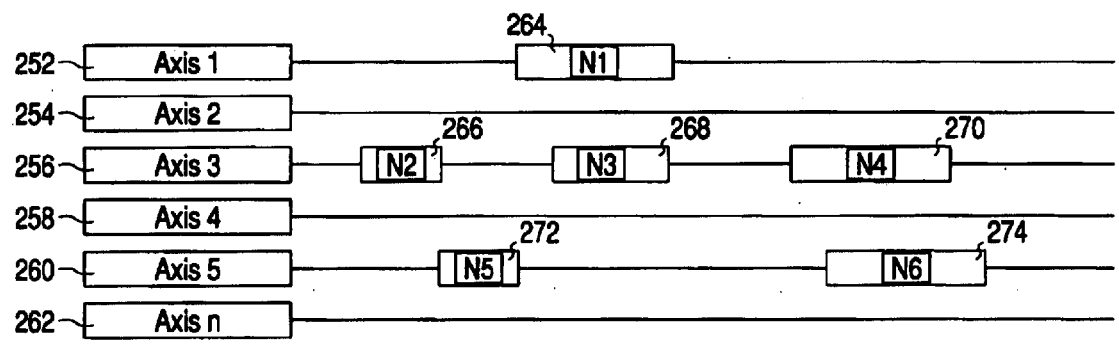
FIG. 12 basic layout of axis-specific, programmable "electronic cams,"
Figure 14:
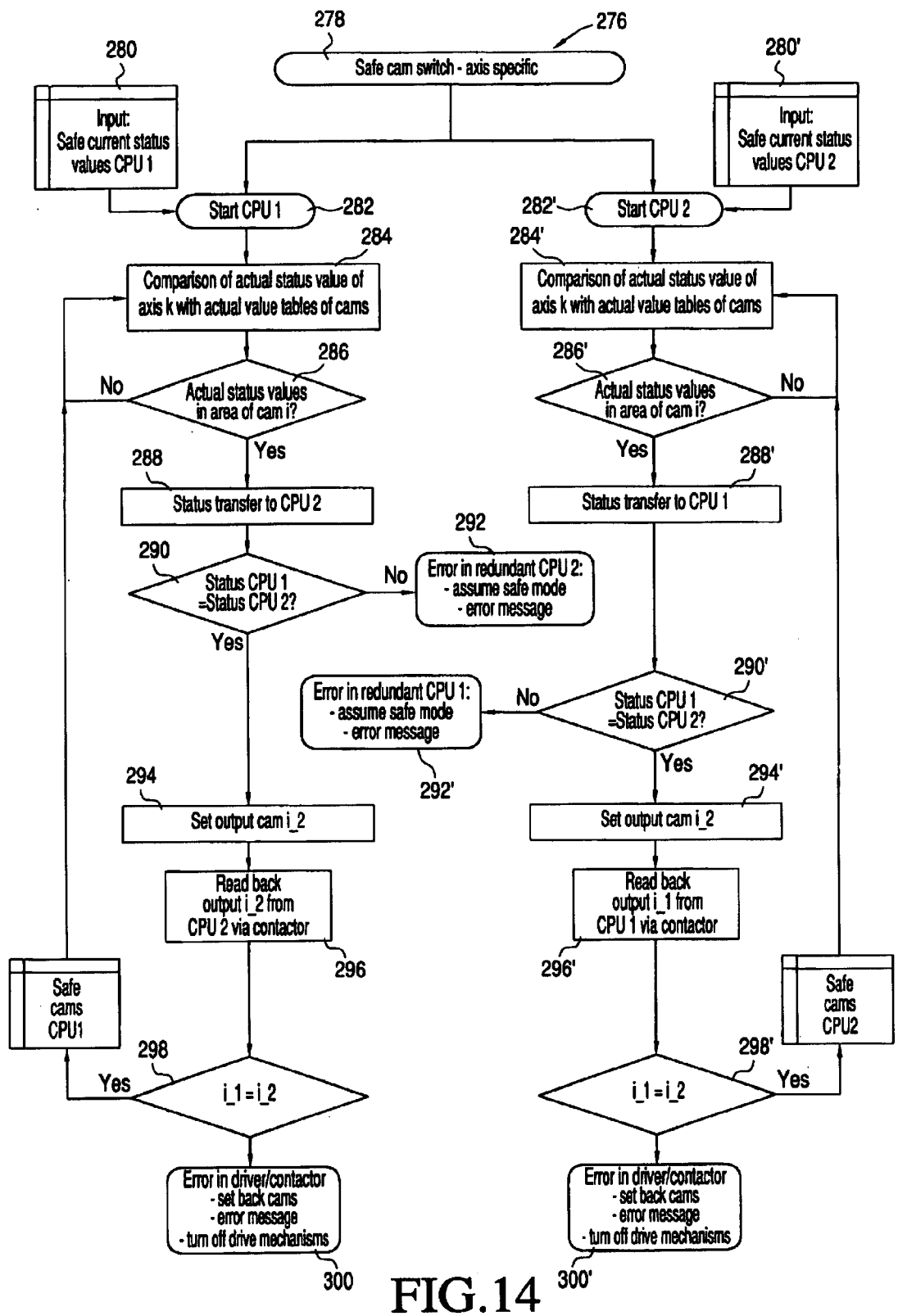
FIG. 14 a flow chart for monitoring axis-specific electronic cams.

FIG. 12 shows the diagrammatic view of movement ranges of the axes 252–262, which are equipped in certain angle ranges with axis-specific, programmable "electronic cams" 264–274. These cams 264–274 apply only to the respective axes 252–262. The electronic cams 264–274 of the individual axes are permanently monitored by the safety controller 38 in accordance with a flow chart 276 depicted in FIG. 14.

In a program step 278, the axis-specific cams are entered into an actual value table. Furthermore, in program step 280, 280', the respective micro-computers 58, 60 are fed the actual status values of the individual drive units 24–30 or appropriate axes 252–262. After the program start 282, 282', a comparison is performed of e.g. the actual status value of the axis 252 to the appropriate value table, in which the cam 264 is defined. Should the actual status value of e.g. the axis 252 be within the range of the electronic cam 264, a program step 286, 286' decides that a status transfer to the micro-computer 58 or the micro-computer 60 occurs in the program step 288, 288'. Program step 290, 290' checks whether the status of the micro-computer 59 corresponds to the status of the micro-computer 60, and vice versa. If this verification is negative, an error message is generated in a program step 292, 292', and the robot 12 assumes a safe status. Otherwise, in a program step 294, 294', a first output "cam 262__1", which is allocated to the cam 264, is set by the micro-computer 58, and a second output "cam 264__2" is set by the micro-computer 60. In another program step 296, 296', the outputs are read back crosswise. As long as the outputs display the same status, a signal that the safe cam has been reached is generated in a program step 298, 298'; otherwise, an error message is generated in a program step 300, 300', the cams are set back and the drive mechanisms are turned off.

Figure 13:
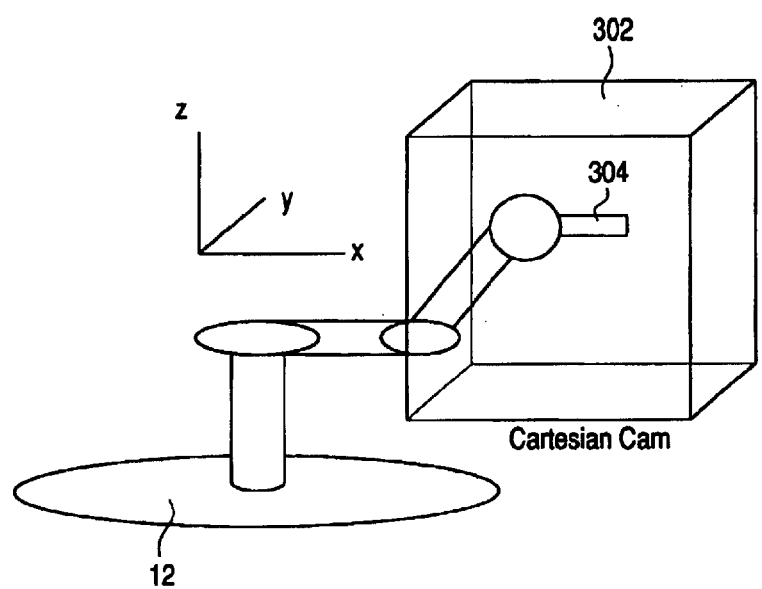
FIG. 13 basic layout of a Cartesian cam.

The number of outputs of the safety controller 38 depends on the respective application. The electronic cams of the respective axes 252 through 262 can be programmed freely by the user. FIG. 13 shows the principle of a Cartesian cam. A Cartesian cam 302 forms a spatial area, preferably a cuboid, within the entire movement range of the robot 12. The actual status values are calculated through kinematic transformation onto a handling device specific point 304 such as a robot flange or TCP (tool center point). An appropriate transformation routine exists in the micro-computers 58 or 60. Through matrix operations, Cartesian coordinates in the Cartesian space are calculated from the received actual status values. In the appropriate matrices, such as Denavit-Hardenberg matrix, a kinematic chain of the robot axes is formed, e.g. a vertical bend robot or a horizontal swivel arm robot etc. These matrices are different for different robot kinematics. The transformation algorithm, however, is the same for all kinematics.

The Cartesian cam 302 enables the monitoring of the robot axes 252–262, with outputs being activated in the output level 92 of the safety controller 38 when the robot 12 is located in a defined position or within a range defined in the space. If the robot 12 has not reached the desired position or is not located in the appropriate area, the specified output is deactivated.

The Cartesian cam 302 can be programmed randomly by the user. Several Cartesian cams can be programmed as well. The number of cams is determined by the maximum expansion of safe inputs and outputs on the safety controller 38. Calculation/setting of the Cartesian cams occurs while taking the braking distance of the respective axis into consideration. As already mentioned, the electronic cams can be defined on a Cartesian basis both for each axis individually, as shown in FIG. 12, or for the sum of all axes, as depicted in FIG. 13. Programming of the cams is performed via tables. One table is provided for each axis and an additional table for the Cartesian monitoring process. In every table, a maximum of 16 cams can be programmed. In every cycle, each table is run in order to check whether an axis is located on a programmed cam or whether the Cartesian position is on a cam. If this is the case, an output, which is also programmed in the table, is set. The following example will illustrate this:

EXAMPLE

Cam Table for Axis 1 (analog to this example also axes 2 . . . 24):

| Cam No. | Cam Start | Cam End | Output No. | Level |
|---|---|---|---|---|
| 1 | O Degrees | 10 Degrees | 10 | 1 |
| 2 | 170 Degrees | 180 Degrees | 11 | 1 |
| . . . | 50 mm | 90 mm | . . . | . . . |
| . . . | . . . | . . . | . . . | . . . |
| 16 | . . . | . . . | . . . | . . . |

Cam Table for Cartesian Monitoring:

| Cam No. | Cam Start | Cam End | Output No. | Level |
|---|---|---|---|---|
| 1 | X = 10 mm<br>Y = 100 mm<br>Z = 1000 mm | X = 2000 mm<br>Y = 1900 mm<br>Z = 1500 mm | 10 | 1 |
| 2 | X = 1000 mm<br>Y = 1500 mm<br>Z = 1200 mm | X = 4000 mm<br>Y = 5000 mm<br>Z = 1500 mm | 11 | 1 |
| . . . | . . . | . . . | . . . | . . . |
| . . . | . . . | . . . | . . . | . . . |
| 16 | . . . | . . . | . . . | . . . |

Figure 15:
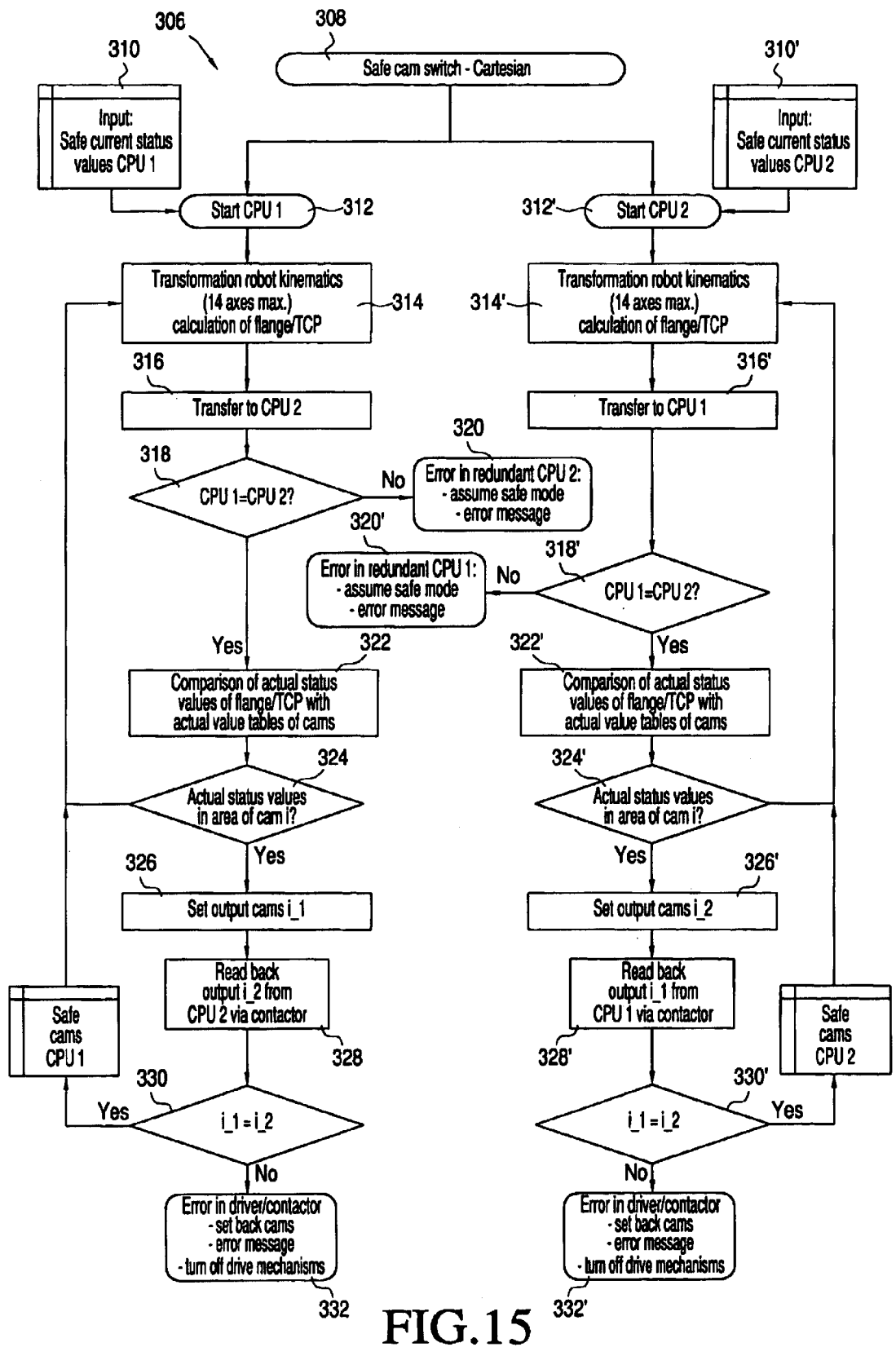
FIG. 15 a flow chart for monitoring a Cartesian cam.

The monitoring or setting of the Cartesian cam is decribed with a flow chart 306 in FIG. 15. The values or value ranges of the safe Cartesian cams are made available to the micro-computers 58, 60 in a program step 308. In the program steps 310, 310', the micro-computers are fed the safe actual status values via the buses. After start in accordance with program step 312, 312', initially robot kinematics, which in particular can comprise a maximum of 2*9=18 axes, is transformed in a program step 314, 314', and the Cartesian actual value of the point 304 is calculated. In program step 316, 316', the calculated Cartesian actual value of the point 304 is transferred to the other micro-computer. Otherwise a comparison occurs with program step 318, 318' as to whether the Cartesian actual values of the micro-computers 58, 60 agree. If the Cartesian actual values differ, an error message is generated in the program step 320, 320', and the robot is switched into a safe status. After that, in program step 322, 322', the actual status values of the TCP are compared to the actual values stored in the table for the appropriate cam. Program step 324, 324' decides whether the actual status values are within the range of the appropriate cams. If this is the case, in program step 326, 326' each micro-computer 58, 60 sets an output that is allocated to the respective cam. Otherwise program step 314, 314' is followed. In program step 328, 328' the respective outputs are read back crosswise. If both outputs have been set, it is decided with program step 330, 330' that the safe cam has been reached. If the status of the outputs does not agree, an error message is generated in program step 332, 332', the cams are set back and the drive mechanisms are turned off.

With a so-called "setting operation," the robot or a robot flange is to be moved at a safely reduced speed. The basis for the safely reduced speed is the safe actual status values of the axes 252 through 262. The actual status values are recorded in intervals of equal duration and converted into Cartesian space coordinates through kinematic transformation and calculated for the point 304. A Cartesian speed of the point 304 is calculated from two transformed position values through differentiation and compared to a maximum permitted speed. When the maximum permitted speed is exceeded, a monitored function such as "STOP 1" is initiated immediately, with the drive units 24 through 30 being stopped in the fastest possible manner, while the energy supply to the drive units is maintained. Based on the relevant standard, the TCP must operate during the setting operation with 250 mm/s max.

The monitoring software must be processed cyclically, while not exceeding a cycle rate (error tolerance time). A cut-off branch includes one transistor driver and the main contactors K1, K2, which also have cut-off times. The cycle time must be established in accordance with the achieved maximum speed in the operating modes SETTING and AUTOTEST, unfavorable axis positions, e.g. in the case of large ranges, the robot kinematics and specified error tolerance time. The effective stopping time is within the range of common switching devices with contacts.

The setting of kinematics, i.e. definition of the kinematic chain, axis lengths, gear data etc. as well as adjustments of the maximum moving speed (250 mm/s max.) are performed once in an initialization phase when the robot control 36 is started up. During this process it must be ensured that the initialized data is recorded by the micro-computers 58, 60 of the safety controller 38, safely stored and protected from write access. The parameters are measured with the help of the robot control 36 and calculated, and must then be verified and confirmed by an operator.

As was mentioned above, the function "STOP 1" is monitored for a controlled fast reduction in speed of the point 304 as follows: According to the invention, a brake ramp monitoring process is performed. In the case of Cartesian brake ramp monitoring, it is to be checked whether the robot 12 reduces its speed when e.g. a "STOP 1" or "STOP 2" function has been triggered. For this, the actual speed or status values of the axes are read at time intervals and transformed in a Cartesian manner. This way, the Cartesian space coordinators of e.g. the tool center point (TCP) or a tool tip are calculated for the currently adjusted tool. By subtracting a Cartesian data set in a first scanning point in time from a data set in a second scanning point in time, one obtains a difference vector. A Cartesian speed can be determined in the space for the tool tip from the resulting difference in time between two scanning points. The calculated speed must be reduced after recognizing a "Stop 1" or "Stop 2" function, which is triggered e.g. with a stop switch or an emergency off switch. If this is not the case, a function "STOP-0" must be performed.

Figure 16:
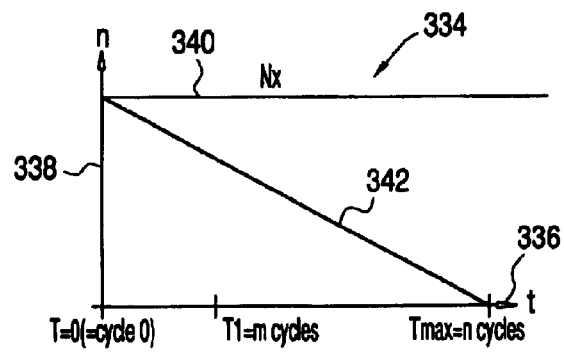
FIG. 16 a speed diagram for depicting the function "brake ramp monitoring,"

Brake ramp monitoring will be described with the help of the diagram 334 shown in FIG. 16. The time t is entered via the abscissa 336 and the speed n is entered via the ordinate 338. At the time T0 a stop function is triggered, and a speed Nx measured at that time is stored. This speed is shown in the diagram 334 as parallel 340 to the abscissa 336. T max is a point in time after n cycles, after the main contactors K1, K2 have been released. The line 342 depicts the current revolution or speed which corresponds to the revolution n=Nx at the time T0 and the speed n=0 at the time Tmax.

At the time T1, the current speed is compared to the starting speed Nx. If the Cartesian speed calculated from the revolutions at the time T1 is equal to or larger than the starting speed calculated from Nx, the function "STOP 0" is triggered immediately. However, if the speed at the time T1 is smaller than the starting speed, the function "STOP 1" is performed until the time Tmax. After the time Tmax, the function "STOP 0" is performed automatically.

Figure 17:
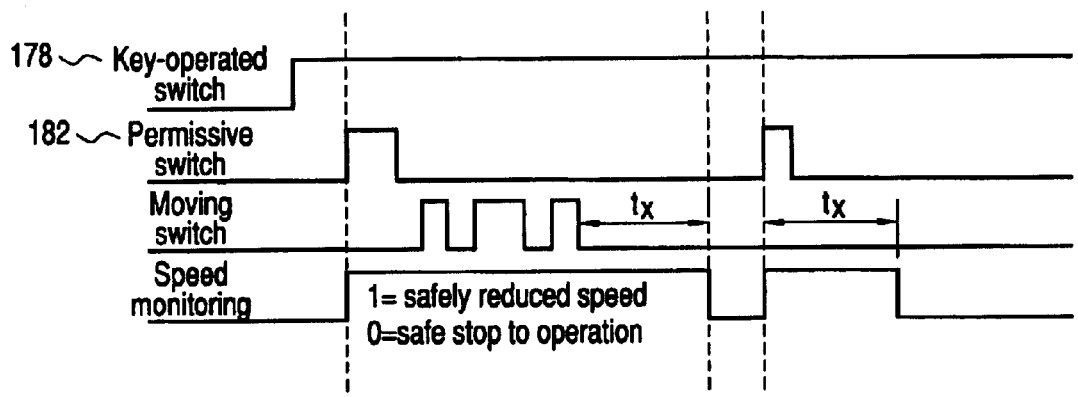
FIG. 17 a pulse diagram to explain the release of the function "safely reduced speed,"
Figure 19:
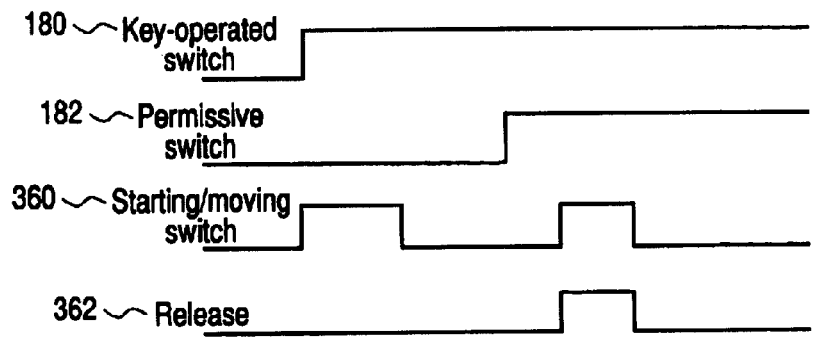
FIG. 19 a pulse diagram to explain the function "TILT OPERATION,"

In order to protect the system from unexpected start-up, it incorporates the measures shown in FIG. 17. Initially, the key-operated selective switch 178 is put into the "SETTING" position, and all moving switches are checked for "not active." At this time, it is being checked for a safe stop. One time actuation of the permissive switch 182 initiates the monitoring process of the safely reduced speed by the safety controller 38. After this time, the robot 12 can be moved with the standard moving switches. However, if the robot 12 is in a non-moving position longer than the time period Tx, i.e. no moving switch was actuated, the system is monitored again for a safe stop. For a renewed start-up, the permissive switch 182 must be actuated again.

Figure 18:
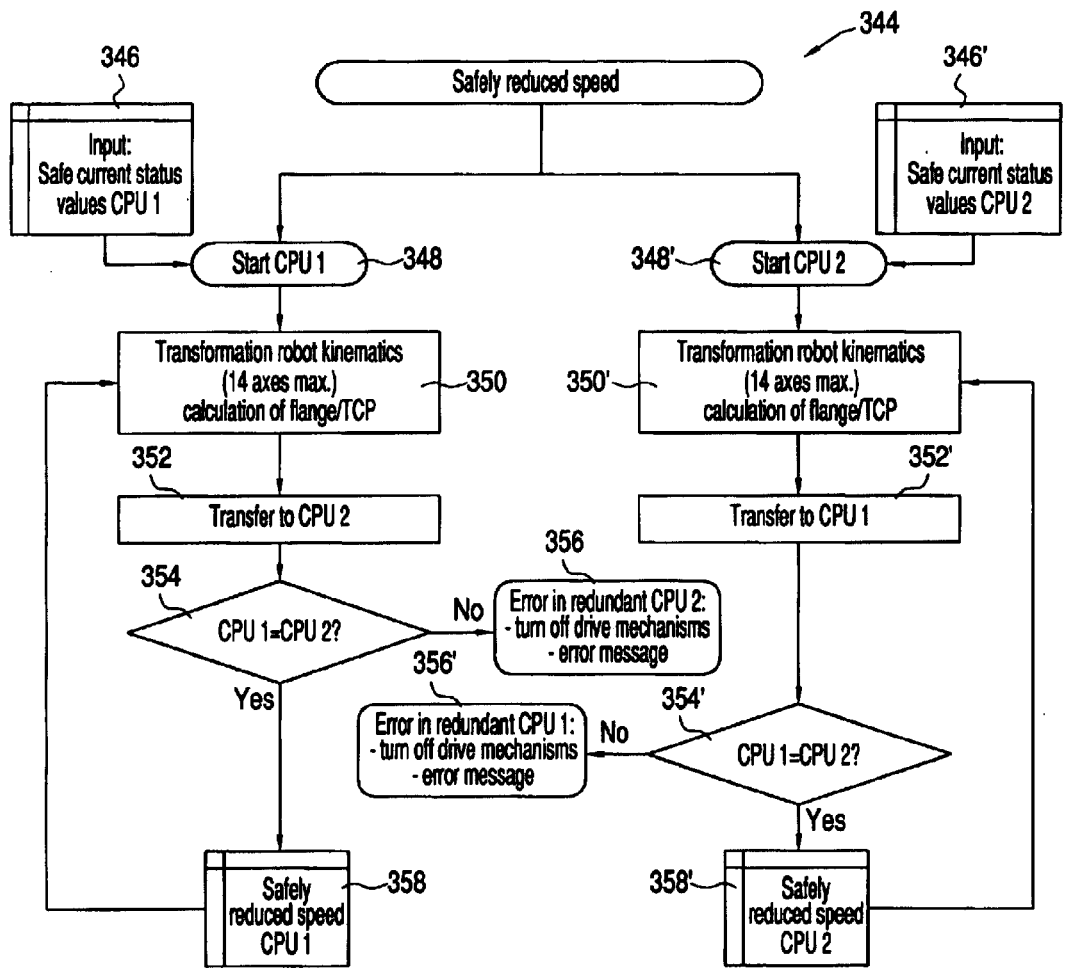
FIG. 18 a flow chart to explain the function "safely reduced speed,"

The flow chart 344 depicted in FIG. 18 shows the monitoring process of the safely reduced speed. In a first program step 346, 346', the safe actual status values are conveyed to the micro-computers 58, 60 of the safety controller 38. After start-up of the micro-computer in program step 348, 348', the actual status values are transformed in a kinematic manner in the program step 350, 350', and the actual speed of the point or of the robot flange 304 is calculated. Afterwards, in a program step 352, 352', the calculated actual speed is transmitted from the micro-computer 58 to the micro-computer 60, and vice versa. In the program step 354, 354', a query is run as to whether the actual speeds that were calculated in the respective micro-computers 58, 60 are identical. If the speeds are not identical, an error message is generated in a program step 356, 356', and the drive mechanisms are turned off. Otherwise, the examination of the safely reduced speed is concluded with the program step 358, 358'.

In some application cases, when the robot 12 is to perform tasks such as painting, it becomes necessary to move the robot during the setting operation with its operating speed. First, an operator must select the operating mode "AUTO-TEST" with the key-operated switch 180 that is integrated in the hand-held programming device 46. In a next step, it is necessary to move the three-step permissive switch 182 into the middle position.

Now the robot starts its movement, this means that a release signal 362 is set as soon as the start moving switch 360 is actuated. When the start moving switch 360 is released, the release signal 362 is set back, and the robot is stopped with a function "STOP 2." The function "STOP 2" signifies a controlled stop, during which power supply to the drive units is maintained.

During a so-called "TILT OPERATION", the safety controller 38 triggers a function "STOP 1" as soon as the permissive switch 182 leaves its middle position after the start moving switch 360 has been actuated. If the start moving switch 360 is released first and then the permissive switch 182, the robot 12 is monitored automatically for standstills, i.e. function "STOP 2."

Figure 20:
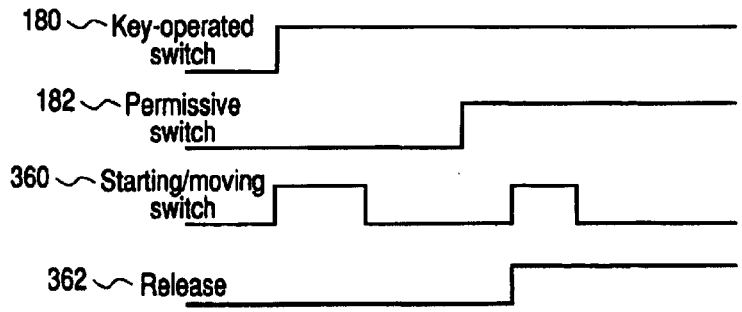
FIG. 20 a pulse diagram to explain the function "PULSE OPERATION,"

During so-called "PULSE OPERATION," which is shown in FIG. 20, a one-time actuation of the moving switch 360 is necessary in order to activate the release signal 362, while the key-operated switch 180 is turned on, the permissive switch 182 has been actuated and is in the middle position and the start moving switch 360 has been actuated.

Furthermore, an operating mode "AUTOMATIC OPERATION" can be selected via the key-operated switch 176. This operating mode can only be executed when the protective doors 20, 22 are closed. With this operating mode, no particular requests are placed with the safety controller 38.

Figure 21:
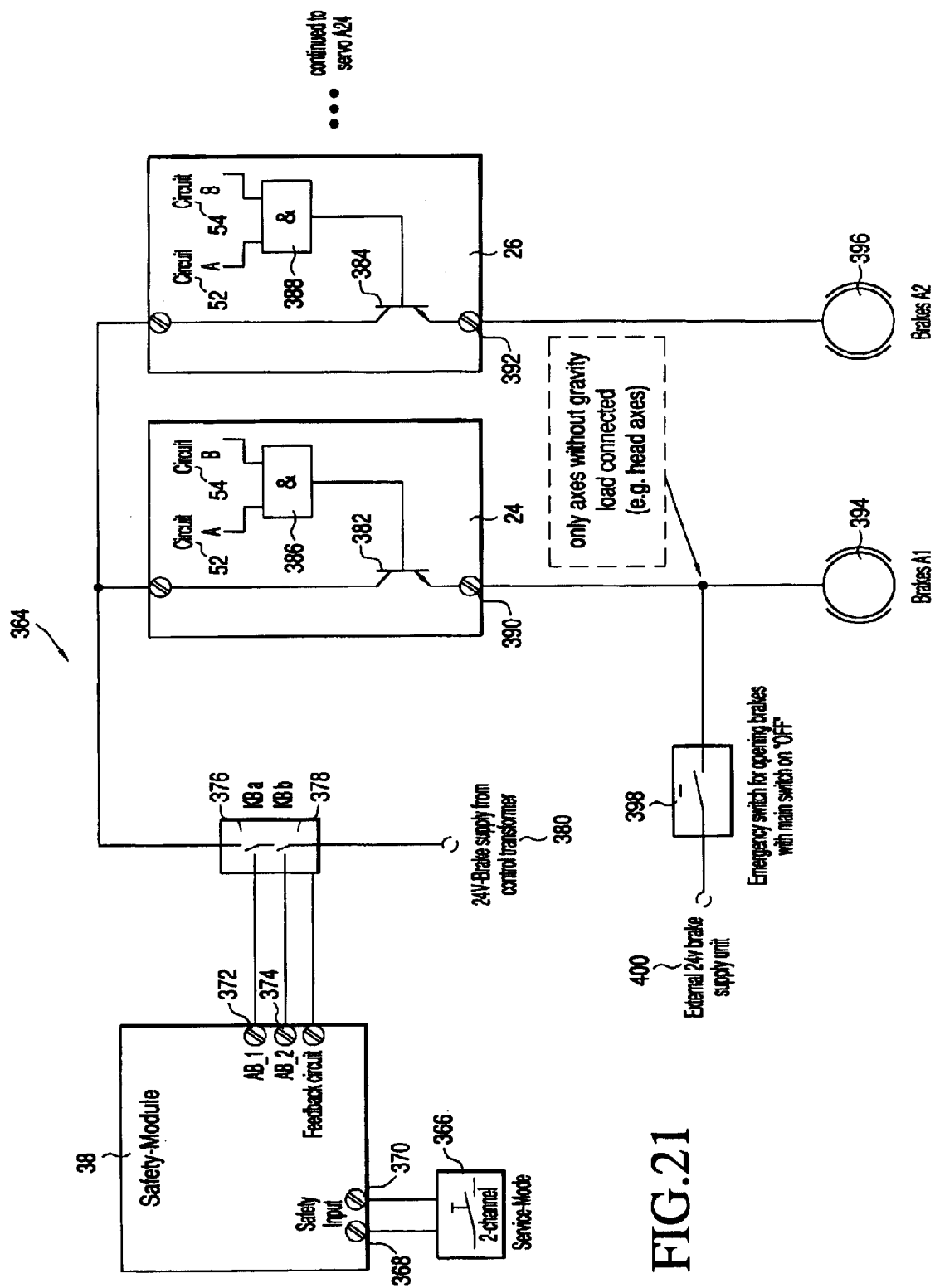
FIG. 21 a logic diagram to address braking units.

FIG. 21 depicts a brake control system in accordance with the invention in the basic logic diagram 364. The brake control process is executed via the safety controller 38, to which a service module 366 is connected via safe inputs 368, 370. Serial contactors contacts 376, 380 are actuated via safe outputs 372, 374, with the contacts directing a 24 V brake supply voltage to the drive units 24 through 30 via an external control transformer 380. The drive units 24 through 30, respectively, are equipped with an electronic switching element 382, 384, which is connected to the redundant circuits or channels 52, 54 of the drive control 50 via an AND element 386, 388. An output 390, 392 of the drive units 24 through 30 is connected to a braking device 394, 396 of the respective drive units. Axis or drive units without gravity load are connected via an emergency switch also with an external 24 V brake supply voltage 400 that is not connected to the main switch of the control units. The connected brake devices can be lifted via the emergency switch 398, even if the power supply for the control unit is switched off at the main switch. The power switch 376, 378 for the brake supply voltage is set up externally. This enhances flexibility towards the number and power requirements of the connected motors or brakes. During normal operating mode, the outputs 372, 374 switch parallel to the outputs for selecting the contactors K1, K2. Should no other operating mode be required, the switching elements 376, 378 can be contacts of the power contactors K1, K2.

For the purpose of examining the running characteristics of the robot, in particular of gear mechanisms or other mechanical elements, by a service technician, the robot is switched to a "SERVICE MODE" operating mode. In this case, the braking device 394 of an axis that is to be checked, for example, must be lifted manually. When in service mode, the robot is being monitored by the service technician. The service mode can be activated at various levels (danger categories). On the one hand, the service mode can be set by selecting a menu in the hand-held programming device 46, and on the other hand, energy—for example power for the brakes—can be released by actuating the service module 366, which is connected to the safe inputs 368, 370.

The following operation is provided for the operating mode "SERVICE MODE," i.e. to manually life the brakes: First, an operating menu is selected in the hand-held programming device 46. Individual keys are defined or released, with which the individual braking devices 394, 396 can be lifted. After that, the service module 366 is set on the safe inputs 368, 370 of the safety controller for setting the service mode, e.g. via a key-operated switch. In this constellation, the safety controller 38 releases the braking power via the switching contacts 376, 378. The brakes 394, 396, however, are not lifted yet. In a next step, the drive control 50 can lift the braking devices 394, 396 of the appropriate axes within the drive units 24 through 30 by engaging the internal brake switch 382, 394. The robot itself is without power in this operating mode. It can only be moved manually or through gravity. A return to normal operation is only possible by resetting the "SERVICE MODE."

In order to eliminate production malfunctions, an operating mode "group control" is provided for. If, for example, the welding robot 12 becomes stuck in an area of the work piece that is difficult to access after a power supply malfunction with a burnt welding wire, the drive units 24 through 30 turn off due to the malfunction. The moving of the robot axes during the setting operation would mean the increased risk of collision with an untrained operator. It is much easier and simpler e.g. on axes without or with little gravity load such as head axes to lift the braking devices 394, 396 with a command via the hand-held programming device and to move the axes manually into a clear position. Axes with a gravity load of about 6 kg can be lifted in this operating mode.

The following operation is provided for this special operating mode: In a first step, the group is stored in a safety-relevant area of machine data. In a second step, an operating menu is selected in the hand-held programming device, with a key being defined or released with which the group of braking devices can be lifted in "TILT OPERATION." In a third step, the safety controller 38 releases the brake line via the switching contacts 376, 378 so that in a fourth step the braking devices of an axis can be lifted by engaging the internal brake switch 382, 384.

The robot is without power also in this operating mode. The axes with lifted brakes can only be moved manually. Axes at risk or subject to gravity are not included in this group definition. The axes that are not released are monitored for standstills during this operating mode. Unintentional engaging e.g. due to a defect of the single-channel brake switch 382, 384 of a drive unit 24–30, which can also be described as a servo amplifier, would lift also the brake of an axis under gravity load, and the axis would be able to move. In this case, the safety controller 38 turns of the brake line off. Selection of the desired operating mode "MOVING" with the hand-held programming device ensures a return to normal operation. The drive mechanisms must be turned on for controlled robot movements.

There is also the possibility of lifting a group of braking devices externally via an external power supply 400 and the emergency switch 398. External lifting of braking devices is reserved only for emergency situations. In this case, the robot control 36 or the safety controller 38 can be turned off, but external auxiliary power is available. When actuating the easily accessible switch 398 (in tilt operation), the braking devices 394 are lifted on all axes that are not subject to gravity load. In this condition, robot mechanisms can be moved manually, e.g. to release a trapped person. Selection of the permissible axes is done with internal switch cabinet wiring, with only the brakes being connected to the external auxiliary energy source 400.

In accordance with the invention, there is also the possibility of checking the braking effect of the braking devices 394, 396. This brake test is performed when the drive mechanisms are turned on. First a main switch is turned on, and the robot control 36 as well as the safety controller 38 are started up. Then the drive mechanisms are turned on, and the braking devices 394, 396 are lifted. After that, a braking current CB is measured on the axes, with the robot axes having different loads and random positions in the space. Furthermore, the braking devices 394, 396 are actuated by switching the internal brake switches 382, 384, and an axis-specific current value $C_{TEST}=C_B \pm C_{OFFSET}$ is released to the final step, with $C_{OFFSET}$ x • $C_{NOM}$ and x in the range of $0.6 \leq x \leq 1.0$, preferably x=0.8, and with $C_{NOM}$ being the current that corresponds to the nominal moment $M_{NOM}$ of the braking device. Additionally, all axes are checked for standstills. If required, the safety controller 38 can check the system for safe stops. Then the offset increase is taken back from the target current value, the braking devices are lifted and the system returns to normal operation.

The nominal torques or moments $M_{NOM}$ of the braking devices vary with the size of the motor so that this information should be stored in the machine data for calculating the current offset value, particularly the value $C_{NOM}$.

The electronics of the drive control 50, also called servo amplifier, is supplied from different power sources in accordance with the operating status. First, each drive control 50 is equipped with a dc-dc converter, with which the entire electronics of the motor control 50 is supplied with power parts and active PWM through a main switch that is in the "ON" operating mode and turned-on drive mechanisms. An external dc-dc converter that is directly connected to the network supplies the entire electronics of the motor control without power parts in the "ON" operating mode, but with turned-off drive mechanisms. Furthermore, only the resolver evaluation electronics is supplied by the external dc-dc converter when the main switch is turned off. During a power failure, it is also only the resolver evaluation logic system that is supplied via an accumulator and an external dc-dc converter.

Figure 22:
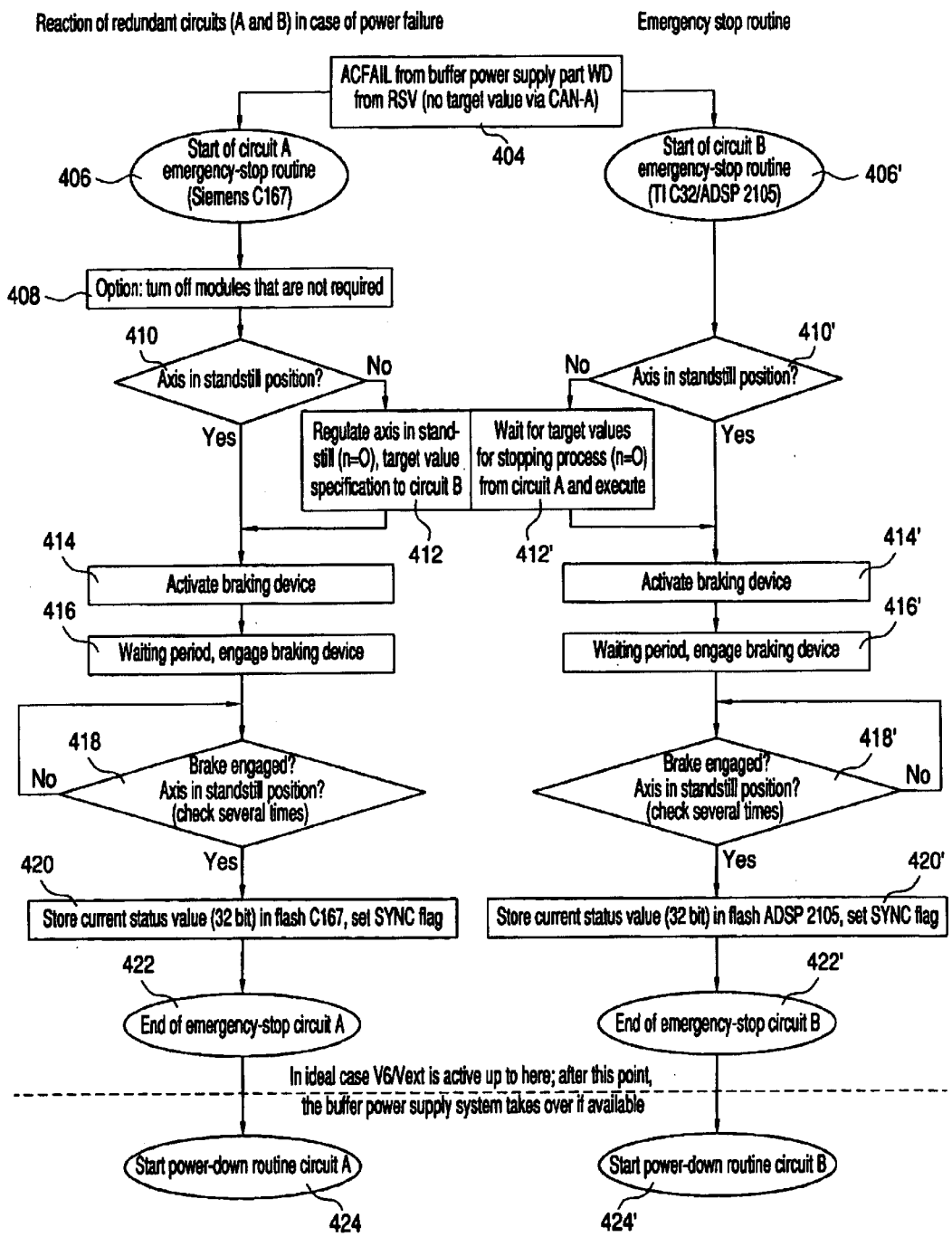
FIG. 22 a flow chart of the function "EMERGENCY STOP-ROUTINE,"

Power failures can occur in various operating modes. In these cases, the system moves continuously to the operating mode with the lowest energy demand. In a flow chart 402 in accordance with FIG. 22, an emergency stop routine is shown. In a first program step 404 an evaluation is performed as to whether a power failure was recognized by the ACFAIL signal or a disconnection of the robot control 36 or the safety controller. If the power failure or disconnection of the robot control was recognized, program step 406, 406' starts an emergency stop routine both in the circuit 52 and in the circuit 54 with the micro-computers 102, 120. In the circuit 52, modules that are no longer required, such as CAN interface 56, LED displays and other modules, can be turned off since the robot control 36 and the safety controller 38 will no longer supplied shortly thereafter. A power failure is recognized with the ACFAIL signal of the external dc-dc converter of the motor control system, and disconnection of the control is recognized when the target values are not received by the bus CAN_A. In another program step 410, 410', an examination is performed whether the axis has stopped. If the axis has not stopped, the axis is first set to a standstill in program step 412, 412'. During the delay period, the generator energy of the motors is consumed. The standard channels of the status control system are used. The programmed path is no longer followed because the robot control no longer works. Stopping of the axis can last 1 to 1.5 s in accordance with robot kinematics.

When a standstill has been reached, further program steps are performed redundantly in the circuits 50, 52. In a next program step 414, 114', the braking device is activated in both circuits, and in program step 416, 416' it is checked after a waiting period whether the brakes collapsed. This occurs through a comparison of several actual status values, which must not change, in the program step 418, 418'. After that, the actual status value is stored in the appropriate system flag 111, 123 with program step 420, 420', consisting of counted revolutions and the resolver value. After successfully writing the actual status value into the flag 111, 123, the axes are marked synchronously. This means a synchronous flag is set. The emergency stop routine ends with program step 422, 422'. Normally, the dc-dc converter of the power part is active up to here because capacitors of the indirect circuit are loaded up to the standstill. After unloading the indirect circuit, the external dc-dc converter with accumulator buffer takes over the energy supply role by triggering program step 424, 424'.

Figure 23:
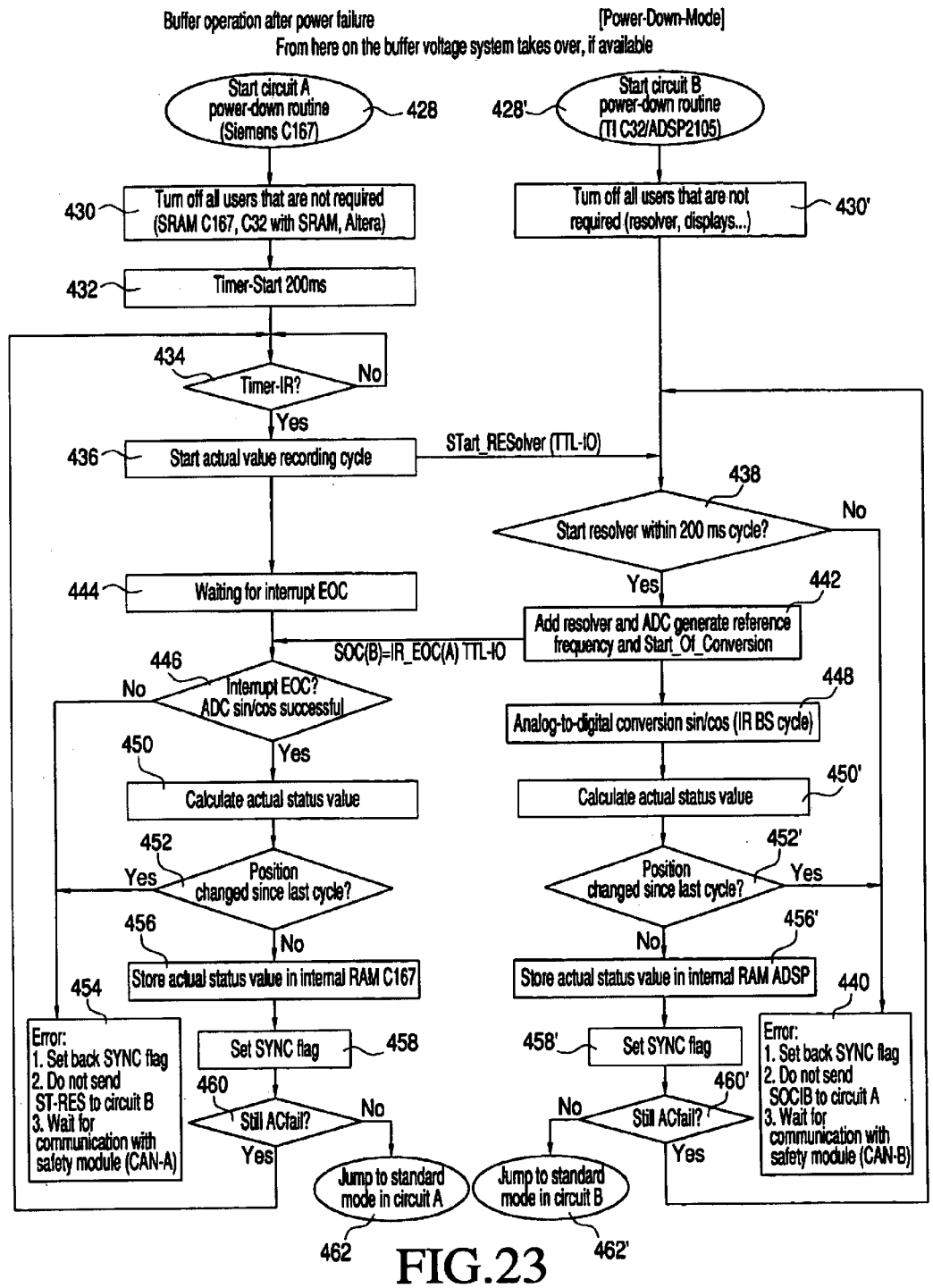
FIG. 23 a flow chart of the function "POWER DOWN MODE,"

The behavior of the drive control 50 during accumulator operation can be seen in a flow chart 426 in accordance with FIG. 23. During power failures, power is supplied via an accumulator, with only the resolver evaluation electronics being supplied. In order to expand the buffer time, users that are no longer required such as SRAM 106 of the micro-computer 102, micro-computer 122 and the divider 118, DP RAM 130, RP RAM 116 are turned off.

Figure 24:
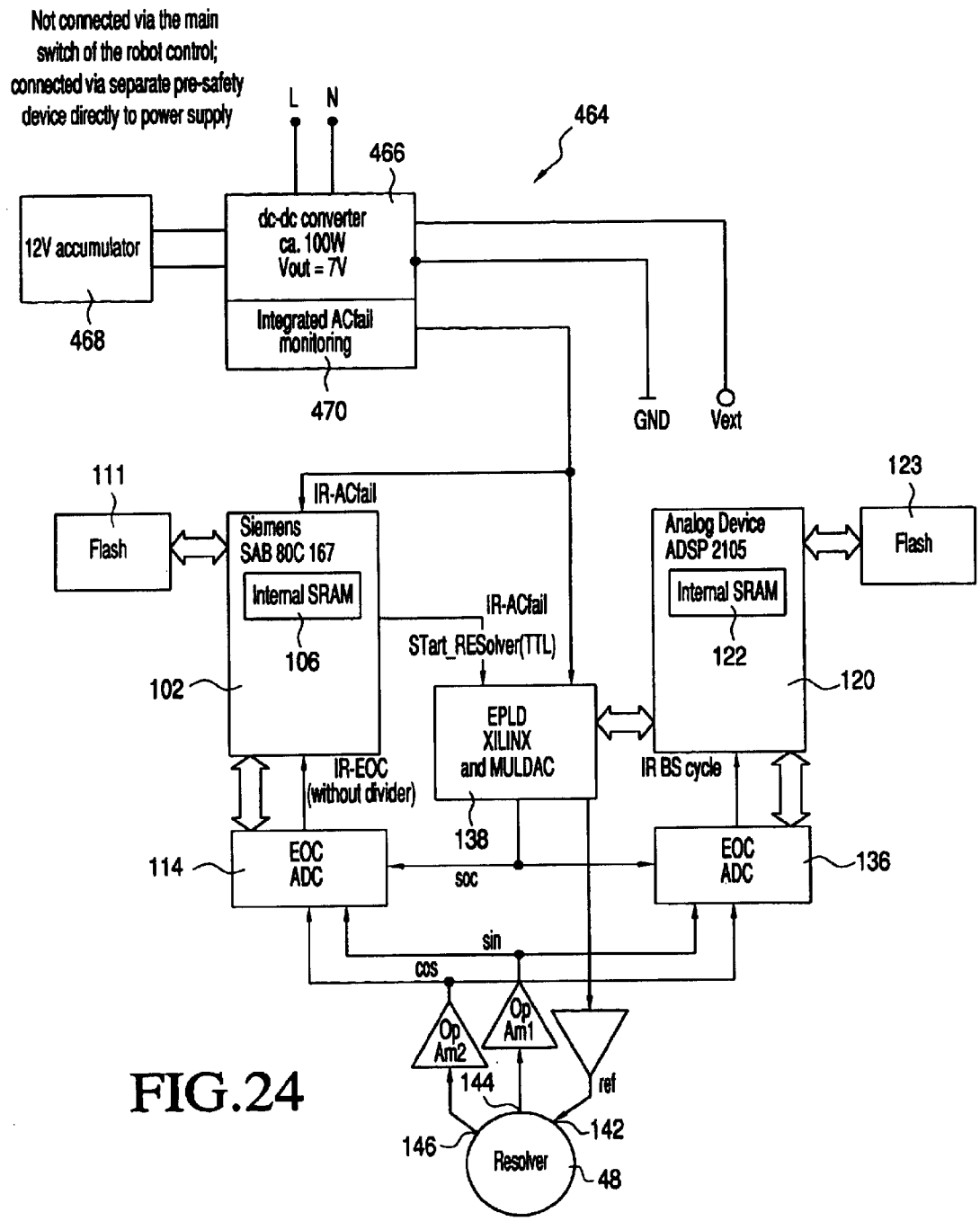
FIG. 24 a logic diagram of hardware elements that are active in case of a power failure.

The remaining active hardware is shown in FIG. 24. In program step 428, 428', the motor control "power down routine" is started in the circuits 52, 54. With program step 430, 430', all users that are no longer required are turned off, as already mentioned above. The redundant micro-computers 102 and 120 only work in the system flash 111, 123 and in the internal SRAM 106, 122. The reference voltage is only activated in the measurement interval in order to minimize consumption.

In program step 432, in circuit 52, i.e. in the micro-computer 102, a time sequence for the cyclical resolver evaluation is specified. In program step 434, the timer time is checked. Every 200 ms a signal "start resolver" is generated in program step 436, via which a resolver evaluation cycle is requested in circuit 54. With program step 438 in the circuit 54, the cyclical request of the circuit 52 is monitored. If the program step 438 detects no signal "start resolver" within 200 ms, a failure is recognized in circuit 52 and an error message is generated in program step 440. The axis is marked asynchronous by the circuit 54, i.e. the synchronous flag is set back and it waits for communication with the safety controller 38.

In the case of correct cyclical requests, the circuit 54 starts its reference frequency generator in the program step 442 and sets its SOC signal (start of conversion) for the analog-to-digital converters in the circuits 52, 54. In program step 444, the circuit 52 waits for the SOC signal. Upon successful conversion, the SOC signal must be recognized in program step 446 in the circuit 52, which monitors the function of the circuit 54 with identical error reaction. In program step 448, an analog-to-digital conversion of the sine/cosine signals is started in circuit 54. Afterwards, the actual status values are calculated in program step 450, 450'. The actual status value is compared with the actual status value of the last cycle in program step 452, 452'. Both actual status values must be in agreement, i.e. the axis must not move. If the actual status values are not identical, an error message is generated in program step 454. If an error is recognized in a circuit 52, 54, cyclical processing is stopped. This forces the redundant partner also into the error status. If no error is detected, both micro-computers 102, 120 store the established actual status value in the respective processor-internal SRMA 106, 122 in a program step 456, 456'. If no error should have occurred by that time, the axis is marked as synchronous by setting a sync flag in program step 458, 458'. After that, it is checked with program step 460, 460' whether the system must remain in the power down mode. If so, the process proceeds with program step 434 or 438. If not, it returns to the standard mode in accordance with program step 462, 462'.

As soon as network power returns, no hardware reset is run in the case of an active accumulator buffer system. The actual status value stored in both circuits 52, 54 in the processor-internal SRAM 106, 122 and the status information is transferred by both circuits to the safety controller 38 in accordance with program step 462, 462' after returning to standard mode. If no error occurred on either side and if both actual status values are identical, the axis is set synchronous with the absolute value of the safety controller and released for automatic operation. If no accumulator buffer system is active or if the buffer power breaks down, e.g. when the accumulator is discharged, the actual status values stored in the flash are retrieved and compared to each other after restarting the system. It is not until the synchronous position has been started up successfully that the axis is set synchronous by the safety controller with absolute values.

FIG. 24 depicts a basic logic diagram 464, which shows the active hardware in power down mode. In the power down mode, only the resolver evaluation electronics is active. It consists of the resolver, the analog-to-digital converters 114, 136, the reference value transmitter 138 and the micro-computer 102, 122 with assigned flash 111, 123. When the main switch is turned off, an external dc-dc converter 466 is connected directly to the network power supply without it being able to be switched via the main switch of the robot control. The dc-dc converter 466 is connected to an accumulator 468, which supplies the resolver evaluation electronics with voltage in case of a power failure. The dc-dc converter 466 is monitored via an integrated ACFAIL monitoring device 470. In case of a power failure, an IR-ACFAIL signal is generated, which is fed to the micro-computer 102 and the control element 138. For the process after that, please refer to the flow chart in FIG. 22.

In case of a drop in power, a hardware reset is triggered in each circuit 52, 54 by a separate supervisor IC (not shown). After that, both circuits 52, 54 are rebooted and initialized, with the stored status information in the internal SRMA 106, 122 being deleted. The actual status values stored in the respective system flash 111, 123 and the synchronous flag are transmitted to the safety controller 38 via the respective CAN_B bus. In the safety controller 38 a decision is made whether the actual status values of both circuits 52, 54 are in agreement and whether the synchronous flag is set in both circuits. After that, the axes are moved into the synchronous position by the robot control 36, and the safety controller 38 sets a release for automatic operation when the sync pos input becomes known for correct actual axis values.

If the actual status values of the two circuits 52, 54 differ from each other or if the synchronous flag has not been set, the axes are asynchronous and must be synchronized by an operator. To accomplish this, the axes are also moved into the synchronous position by the robot control, and then the safety controller 38 sets the release for automatic operation when the sync pos input becomes known for correct actual axis values.

In the case of the accumulator buffer system, no hardware reset is conducted when power returns. The stored status information (synchronous/asynchronous) and the actual status value in the respective internal SRAMs 106, 122 are transmitted by both circuits to the safety controller 38. The safety controller compares whether the actual status values of both circuits 52, 54 are in agreement and whether a synchronous flag was set in both circuits. If this is the case, the safety controller 38 sets a release for automatic operation, but the synchronous position does not have to be assumed. If the actual status values of the two circuits differ or if the synchronous flag was not set, the axes are asynchronous and must be synchronized by an operator. To accomplish this, the axes are moved into the synchronous position by the robot control 36. After that, the safety controller 38 sets its release for automatic operation when the sync pos input has been recognized for correct actual axis values.

What is claimed is:

1. Monitoring and control device (38) for monitoring a technical system (10) with enhanced safety requirements that comprises at least one portable and/or mobile and/or immobile device a handling device arranged in a protective device, with at least one preferably central and/or decentralized control unit (36) as well as actuators (24–30; K1, K2) connected to the control unit for executing dangerous operations, whereby the monitoring and control device (38) is connected to sensors (20, 22) and/or actuators (24–30) and evaluated, processes and controls their status, the control unit (36) is connected to sensors (20, 22) and/or at least one of the actuators (24–30) and the monitoring and control device (38) via at least one data circuit, that the monitoring and control device (38) transmits at least one release signal to the control unit (36) in accordance with the status of the sensors (20, 22) and/or actuators (24–30) in order to enable at least one operation in the technical system (10), that the release signal triggers an operation, which is monitored by the monitoring and control device (38) by comparing the release signal with stored and/or specified execution and/or function and/or plausibility specifications or processes of movements, and that in case of an error at least one other signal is generated, which transfers the system into a safe condition characterized in that microcontrollers (58, 60, 102, 120) are connected to each other via a connection (88) for mutual data exchange purposes that the actual status values transmitted by the drive controls (50) are declared with an identifier and that upon receipt of these identifiers an interrupt is triggered in each microcontroller (58, 60, 102, 120) of the monitoring and control device, and that the monitoring and control device is equipped with a time expectancy device for safety-related data and that each actual status value and/or value range is assigned at least one safety-related output and/or input (92, 94) of the monitoring and control device (38), with the outputs and/or inputs being connected to passive and/or active switching elements (96, 98).

2. Monitoring and control device in accordance with claim 1, characterized by the fact that the actuator (24 30; K1, K2) and/or the sensor (20, 22) has the design of a safety device (14) that transfers the technical system (10) into a safe status.

3. Monitoring and control device in accordance with claim 1, characterized by the fact that the actuator (24–30) includes in particular a drive unit (24–30) with appropriate drive control (50), a contactor (K1, K2), a relay or a valve.

4. Monitoring and control device in accordance claim 1, characterized by the fact that the operation comprises a process of movements.

5. Monitoring and control device in accordance with claim 1, characterized by the fact that the data circuit comprises a serial bus line (CAN_A).

6. Monitoring and control device in accordance with claim 5, characterized by the fact that the monitoring and control device (38) is equipped with two channels, each with at least one microcontroller (58, 60, 102, 120), with each microcontroller (58, 60, 102, 120) being connected to the bus line (CAN_A, CAN_B) via a bus controller (62, 64).

7. Monitoring and control device in accordance with claim 1, characterized by the fact that the control unit (36) and the monitoring and control device (38) are physically separate devices.

8. Monitoring and control device in accordance with claim 1, characterized by the fact that a target status value signal is transmitted continuously or once to at least one connected drive control (50)

and/or to the monitoring and control device and that from the at least one drive control (50) actual status value signals are transmitted at least to the control unit (36), to both the control unit (36) and the monitoring and control device (38), that the actual status value signals of every drive control (50) are compared to drive-specific values and/or value ranges that have been stored in the monitoring and control device (38) and been transferred by the control unit (36), and that upon deviation from the respective value and/or value range the other signal is generate.

9. Monitoring and control device in accordance with claim 8, characterized by the fact that the actual status values of individual drive units (24–30) are calculated in the monitoring and control device (38) and/or the control unit (36) through kinematic-specific transformation to a handling device specific point (304) and that Cartesian value ranges are stored in a table for n-dimensional movement, wherein n=3, with every actual status value range being assigned at least one output of the monitoring and control device (38).

10. Monitoring and control device in accordance with claim 9, characterized by the fact that the n-dimensional, wherein n=2 or n=3, value ranges stored in the tables are compared with received and transformed actual status values during every cycle.

11. Monitoring and control device in accordance with claim 8, characterized by the fact that the actual status values of all drive units (24–30) are determined and are calculated to a handling device specific point (304) through kinematic-specific transformation and that a Cartesian speed of the point (304) is calculated from at least two transformed position values through differentiation and compared to a specified maximum speed.

12. Monitoring and control device in accordance with claim 11, characterized by the fact that monitoring of the speed occurs in a cyclical manner.

13. Monitoring and control device in accordance with claim 12, characterized by the fact that upon triggering the other signal a Cartesian starting speed $V_{Start}$ of a point (304) is determined and stored, that after a time period $\Delta T$ a current speed $V_{curr}$ is determined and compared to a starting speed $V_{Start}$, with the system being transferred immediately into a safe status when the current speed $V_{curr}$ is equal to or larger than the starting speed $V_{Start}$ after the time period $\Delta T$.

14. Monitoring and control device in accordance with claim 1, characterized by the fact that the monitoring and control device (38) is equipped with a two-channel output and input level (66) with crosswise data comparison for evaluating electromechanical safety switches (366) and for addressing external switching devices (376, 378) and/or that at least one additional bus connection (72) is provided in order to integrate the monitoring and control device (38) into a higher-ranking safety bus.

15. Monitoring and control device in accordance with claim 1, characterized by the fact that the control unit (36) transmits target status value information driving to defined positions to the at least one of the actuators (24–30) and to the monitoring and control device (30), with the defined positions being assigned drive-specific values that are transmitted to the monitoring and control device and compared to measured actual status values of the actuators (24–30) and monitored.

16. Monitoring and control device in accordance claim 1, characterized by the fact that with regard to a drive unit (24–30) or drive axis a variety of value ranges is defined, which are monitored by the monitoring and control device (38) in a drive-specific manner, with each actual status value and/or value range being assigned one or more outputs of the monitoring and control device (38).

17. Monitoring and control device in accordance with claim 16, characterized by the fact that the actual status values and/or value ranges can be programmed in a drive-specific manner.

* * * * *